(12) United States Patent
Dower et al.

(10) Patent No.: US 9,543,746 B2
(45) Date of Patent: *Jan. 10, 2017

(54) ENCLOSURE FOR A CABLE CONNECTION

(71) Applicant: 3M INNOVATIVE PROPERTIES COMPANY, St. Paul, MN (US)

(72) Inventors: William V. Dower, Austin, TX (US); Scott D. Turner, Austin, TX (US); David M. Dupuis, Austin, TX (US); James G. Wilder, Austin, TX (US); Curtis L. Shoemaker, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,637

(22) Filed: Sep. 18, 2014

(65) Prior Publication Data

US 2015/0034357 A1  Feb. 5, 2015

Related U.S. Application Data

(63) Continuation of application No. 13/228,982, filed on Sep. 9, 2011, now Pat. No. 8,841,553.

(60) Provisional application No. 61/394,503, filed on Oct. 19, 2010, provisional application No. 61/483,207, filed on May 6, 2011, provisional application No. 61/497,718, filed on Jun. 16, 2011.

(51) Int. Cl.
*H02G 15/10* (2006.01)
*H02G 15/18* (2006.01)
*H02G 15/113* (2006.01)

(52) U.S. Cl.
CPC ............ *H02G 15/18* (2013.01); *H02G 15/113* (2013.01)

(58) Field of Classification Search
CPC ................................................ H02G 15/113
USPC ........................................................ 174/92, 93
See application file for complete search history.

(56) References Cited

U.S. PATENT DOCUMENTS

| | | | |
|---|---|---|---|
| 3,030,601 | A | 4/1962 | Krebs |
| 3,048,810 | A | 8/1962 | Steen |
| 3,545,773 | A | 12/1970 | Smith |
| 4,612,680 | A | 9/1986 | Daiguji |
| 4,701,574 | A | 10/1987 | Shimirak |
| 5,502,281 | A | 3/1996 | Schoelling et al. |
| 5,594,210 | A | 1/1997 | Yabe |
| 5,661,842 | A | 8/1997 | Faust |
| 6,218,620 | B1 | 4/2001 | Michel |
| 6,283,670 | B1 | 9/2001 | Blankinship |

(Continued)

FOREIGN PATENT DOCUMENTS

| | | |
|---|---|---|
| DE | 37 43 270 A1 | 6/1989 |
| EP | 1 261 094 A1 | 11/2002 |

(Continued)

*Primary Examiner* — Chau N Nguyen
(74) *Attorney, Agent, or Firm* — Janet A. Kling

(57) ABSTRACT

The present invention is directed to an enclosure for protecting a cable connection. The enclosure includes a sealing member contained within an inner shell. The sealing member is secured around the cable connection by slideably engaging a rigid outer shell over the inner shell. The inner shell has an external topography defining an inner shell profile and wherein the outer shell has an internal topography defining an outer shell profile such that the outer shell profile is similar to the inner shell profile.

8 Claims, 20 Drawing Sheets

(56) References Cited

U.S. PATENT DOCUMENTS

| | | |
|---|---|---|
| 6,333,463 B1 | 12/2001 | Bukovnik |
| 6,864,427 B2 | 3/2005 | Radelet |
| 6,955,558 B1 | 10/2005 | Low |
| 7,141,738 B2 | 11/2006 | Marsac |
| 7,253,362 B1 | 8/2007 | Dower |
| 7,282,644 B1 | 10/2007 | Alvey |
| 7,304,242 B1 | 12/2007 | Dower |
| 7,304,244 B1 | 12/2007 | Dower |
| 7,307,219 B1 | 12/2007 | Dower |
| 7,511,222 B2 | 3/2009 | Taylor |
| 7,531,748 B2 | 5/2009 | Dower |
| 7,690,940 B1 | 4/2010 | Burr |
| 8,262,094 B2 * | 9/2012 | Beele .................. F16L 5/10 277/607 |
| 8,378,214 B2 | 2/2013 | Ambo |
| 8,425,143 B2 * | 4/2013 | Kondo .................. F16G 11/02 403/368 |
| 8,490,353 B2 * | 7/2013 | Beele .................. F16L 5/10 277/607 |
| 8,841,553 B2 * | 9/2014 | Dower .................. H02G 15/18 174/92 |
| 2004/0238201 A1 | 12/2004 | Asakura |
| 2006/0037687 A1 * | 2/2006 | Buekers ............... H02G 15/003 156/53 |
| 2008/0169116 A1 | 7/2008 | Mullaney |
| 2008/0264669 A1 | 10/2008 | Bedingfield |

FOREIGN PATENT DOCUMENTS

| | | |
|---|---|---|
| EP | 1 981 140 A2 | 10/2008 |
| JP | 58-214285 A | 6/1983 |
| JP | 62-501396 A | 6/1987 |
| JP | 09-045429 A | 2/1997 |
| JP | 11-041781 A | 2/1999 |
| JP | 11-204982 A | 7/1999 |
| JP | 2002-056906 A | 2/2002 |
| WO | WO 95/12778 | 5/1995 |
| WO | WO 00/67354 | 11/2000 |
| WO | WO 01/78207 | 10/2001 |
| WO | WO 2006/029225 | 3/2006 |

* cited by examiner

ENCLOSURE FOR A CABLE CONNECTION

CROSS REFERENCE TO RELATED APPLICATIONS

This application is a continuation of U.S. patent application Ser. No. 13/228,982, filed Sep. 9, 2011, now allowed, which claims the benefit of U.S. Provisional Patent Application No. 61/394,503, filed Oct. 19, 2010; U.S. Provisional Patent Application No. 61/483,207, filed May 6, 2011; and U.S. Provisional Patent Application No. 61/497,718, filed Jun. 16, 2011. The disclosures of each of the aforementioned applications are incorporated by reference herein in their entirety.

FIELD OF THE INVENTION

The present invention relates to an enclosure to protect a connection between two cables, or the connection between a cable and a housing. In particular, the present invention relates to an enclosure having a sealing member contained within an inner shell wherein the sealing member is secured around the cable connection by engaging a rigid outer shell over the inner shell to ensure a reliable environmental seal for the cable connection.

BACKGROUND

Telecommunication cables are ubiquitous and used for distributing all manner of data across vast networks. As telecommunication cables are routed across data networks, it is necessary to periodically connect the cable to other cables or equipment.

At each point where a cable connection is made, it may be necessary to provide protection for the cable connection and to protect the cable interfaces from environmental contaminants. This can be accomplished by wrapping the cable connection in a tape or mastic and/or placing the cable connection in a protective enclosure. Commonly, the enclosure has one or more ports through which cables can enter and/or exit the enclosure. Once the cables are routed into the enclosure, the cable connections can be made.

Typical enclosures for the telecommunications market provide mechanical and/or environmental protection for cable connections. The cable can, for example, be a telecommunications cable, a power cable, an optical fiber cable, coaxial cable, or any other type of cable. The cable connection can be made via a conventional splice or a connector and may require protection from the effects of the environment in which it is located and, more particularly, benefits from protection against mechanical impact and the entry of moisture, dirt, salt, acid rain, or other environmental contaminants.

Many different types of enclosures providing different levels of protection for cable splices are commercially available, including so-called re-enterable enclosures that can be re-opened to permit access to the splice whenever required. These conventional telecommunication enclosures are often employed to protect a plurality of twisted pair copper splices and/or fiber optic connections in the outside plant telecommunications market. These closures can be relatively large and bulky and are not well suited to applications requiring a single closure to protect a single connection point between two or more communication cables, between a cable and a housing (e.g. a cabinet, a bulkhead, a larger enclosure or housing for a piece of equipment) or between a cable and a piece of equipment, especially when the cable connections are densely placed or ganged connections such as one might find in cell tower installations. Thus, a need exists for a smaller, more craft friendly enclosure which will fit in tight spaces and which has improved workability in the field.

SUMMARY

The present invention is directed to an enclosure for protecting a cable connection. The enclosure includes a sealing member contained within an inner shell. The sealing member is secured around the cable connection by slideably engaging a rigid outer shell over the inner shell. The inner shell has an external topography defining an inner shell profile and wherein the outer shell has an internal topography defining an outer shell profile such that the outer shell profile is similar to the inner shell profile.

In a first exemplary embodiment, the inner shell has a tapered inner shell profile having a first diameter at a first end of the inner shell and a second larger diameter at the second end of the inner shell.

The inner shell can include two shell portions that enclose a cable connection when the two shell portions are assembled together. In an exemplary aspect the shell portions can be connected by a hinge along one longitudinal edge of each shell portion.

In another exemplary embodiment, the sealing member can be a sheet sealing member including a gel sealant material coated on one of an elastomeric sheet and a volume compliant sheet.

BRIEF DESCRIPTION OF THE DRAWINGS

The present invention will be further described with reference to the accompanying drawings wherein like reference numerals refer to like parts in the several views, and wherein.

Figure 1A:
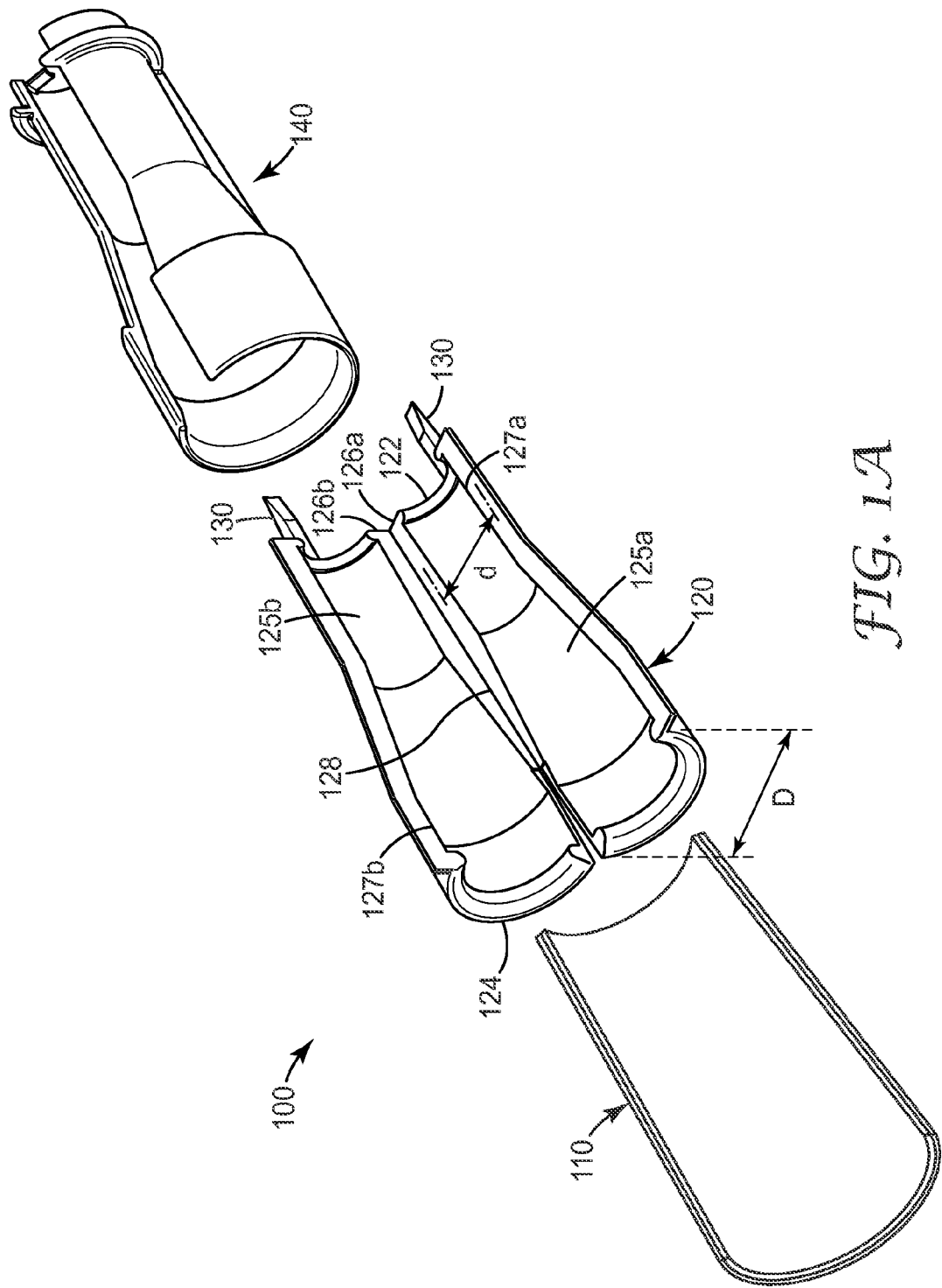
FIG. 1A is an exploded isometric view of an exemplary enclosure according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention relates to an exemplary enclosure to protect a connection between two or more cables, or a connection between a cable and a housing or piece of equipment. The exemplary enclosure can also be used to repair the sheath of a cable that has been damaged such as can occur when utility crews are digging around or near buried cables. In yet another aspect, the exemplary enclosure can be used to provide environmental protection at the point where a cable enters duct to prevent contaminants from entering the duct. In an alternative aspect, the exemplary enclosure can protect the junction between a cable and a ground wire.

Many conventional connectors used in the telecommunication, cable TV and utility industries, even those having internal sealing members (i.e. O-rings), do not provide adequate environmental and/or mechanical protection for the cable connection by themselves. Without additional external protection, water and other contaminants can penetrate the system and degrade the electrical or optical connection. To compensate for this shortcoming in the connectors, system operators will frequently place the cable connection in a molded enclosure or wrap the cable connection with tapes and/or mastics to provide the necessary environmental and mechanical protection.

However, in some applications, where it is desirable to individually protect connections in confined spaces, such as in cellular installations, there can be too little space to accommodate conventional molded enclosures. In some instances operators utilize a process that involves wrapping multiple alternating layers of tape and mastic around and over the connector and the adjacent cabling to provide a measure of environmental protection for the connection. This wrapping process can be a tedious, time consuming operation and its effectiveness is dependent on the skill of the installer. Additionally, when the wrap process is employed in aerial installations such as those that occur high up on cellular towers, the difficulty in properly using these materials is amplified and ultimately affects the safety of the technician. Finally, the tape/mastic wrapping must be cut away during routine inspection and maintenance operations and reapplied when these operations are complete, requiring additional time and expense.

Thus, what is needed is a new form of protective enclosure which can be quickly and easily applied in confined spaces, such as closely packed connector arrays found on cellular tower antennas, to replace the cumbersome tape process or the more bulky molded plastic enclosures.

The small form factor enclosure 100, as described herein, is of simple construction, and uses comparatively few components to enable easy assembly in the field, even at difficult or inaccessible locations.

Figure 1B:
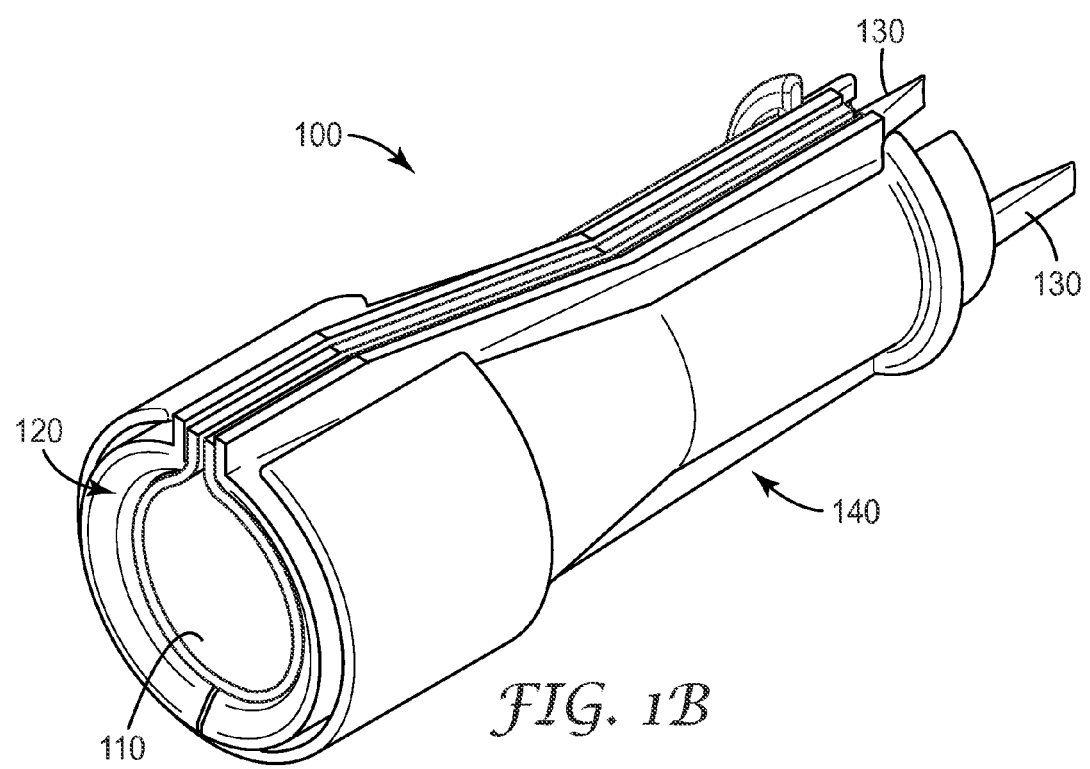
FIG. 1B is an isometric view of an assembled enclosure according to an embodiment of the present invention.

Referring to FIGS. 1A and 1B, one embodiment of an exemplary enclosure 100 for protecting a cable connection is illustrated in an exploded and assembled condition, respectively. Enclosure 100 includes three parts: an inner shell 120, an outer shell 140, and sealing member 110 which can be disposed within the inner shell.

The inner shell 120 is effectively a holder for sealing member 110. The inner shell includes "pressure points", which will be described in additional detail below, to ensure adequate sealing at key locations when the inner shell and sealing member are placed around a cable connection.

The outer shell 140 can be placed over the inner shell to impart a radial compressive load to the inner shell. This radial load presses the sealing member into contact with the cable(s) and connector thereby creating an environmental seal. The outer shell can be a rigid member that includes an opening along the entire length of one side to permit clearance for the cable to be inserted into the outer shell. The outer shell, when proper compression is achieved, can be locked in place with a securing device, such as latch arms 130 provided as an integral part of the inner shell. Advantageously, exemplary enclosure 100 can be opened to expose the cable connection for inspection or maintenance and then reinstalled over the connection when the inspection or maintenance is complete. For example, outer shell 140 can be removed from the inner shell 120 by the deflection of the latch arms 130. Once the outer shell has been removed, the inner shell can be opened and the sealing member separated to reveal the cable connection.

In an exemplary aspect, the outer shell can be tethered to the inner shell to ensure that the outer shell can not be dropped while the inner shell is installed around the cable connection. For example, the exemplary tether linking the outer shell to the inner shell can be a string, cord, or small diameter cable.

Figure 2A:
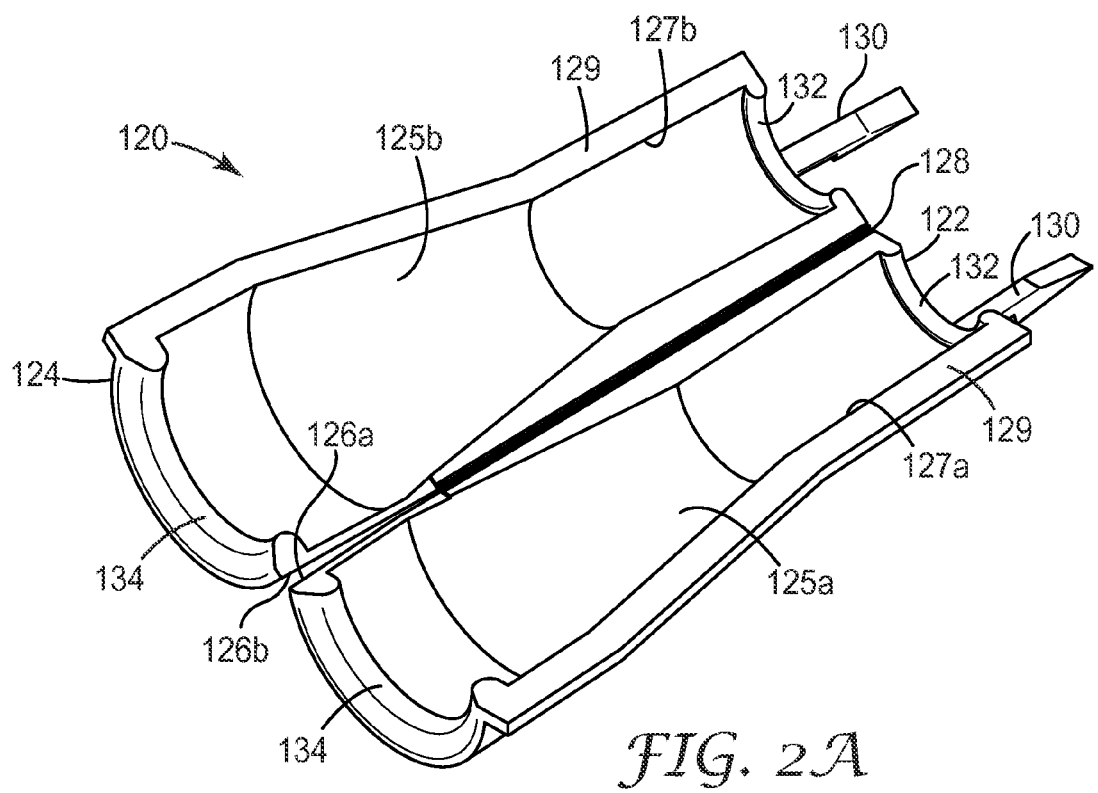
FIGS. 2A and 2B are two isometric views of an inner shell for the exemplary enclosure of FIGS. 1A and 1B.

In an exemplary aspect shown in FIG. 2A, the inner shell 120 can include two shell portions 125a, 125b that can enclose a cable connection when the two shell portions are assembled together. The shell portions 125a, 125b can be connected by a hinge 128 along a first longitudinal edge 126a, 126b of each shell portion. Hinge 128 can be a living hinge or any other conventional low profile hinge structure such as a barrel hinge. Hinge 128 may extend along the entire first longitudinal edges of shell portions, or may extend along only a portion of first longitudinal edges 126a, 126b of shell portions 125a, 125b, respectively as shown in FIG. 2A. The hinge allows the inner shell to be opened so that it can be easily placed around the cable connection and then closed to enclose the cable connection.

In another exemplary aspect, shell portions 125a, 125b can be two separate parts, each having a sealing member disposed across their concave surface. The two separate shell portions can be mated together and the outer shell portion can be slid over the mated shell portions to lock them together while simultaneously providing a radial force compressive load to the inner shell which will ensure that the sealing member intimately contacts the cable(s) and connector thereby creating an environmental seal.

As previously mentioned, the inner shell 120 is effectively a holder for sealing member 110. The sealing member can be attached to the inner shell along the second two longitudinal edges 127a, 127b of the inner shell. In the exemplary aspect shown in FIGS. 2A and 2B, flanges 129 extend perpendicular to the second two longitudinal edges 127a, 127b of the inner shell. Sealing member 110 can be attached to the flange by an adhesive such 3M™ Adhesive Transfer Tape 9672 available from 3M company (St. Paul, Minn.), a thermal weld, stitched, or by a mechanical fastening system. Two exemplary mechanical fastening systems are shown in FIGS. 6A-6E.

Figure 6A:
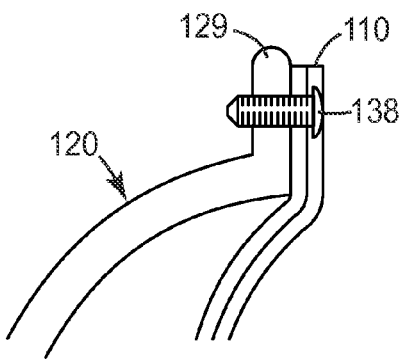
FIGS. 6A-6E illustrate different ways of attaching the sealing member to the inner shell according to the present invention.
Figure 6B:
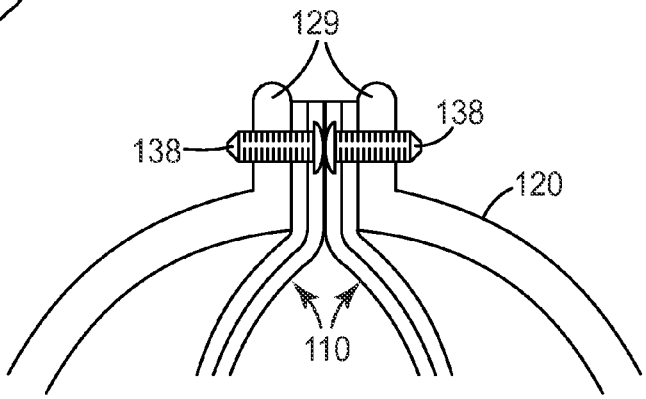
Figure 6C:
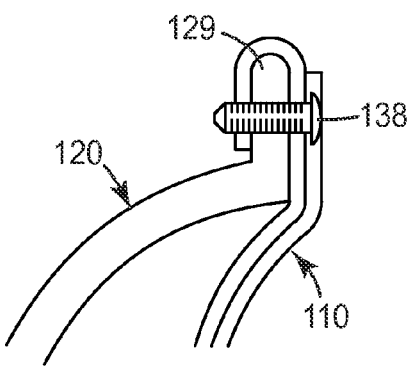

FIGS. 6A-6C show how a "pine tree" fastener 138 can be used to attach sealing member 110 to the inner shell 120. The sealing member can either be laid along one side of flange 129 (FIG. 6A) or folded over top of the flange and secured in place by passing the "pine tree" fastener 138 though the sealing member and the flange 129 of the inner shell 120. The barbs on the shank of the "pine tree" fastener hold the "pine tree" fastener securely in place. The fasteners can be placed intermittently along the longitudinal length of the flange. FIG. 6B shows the inner shell in a closed configuration where the "pine tree" fasteners are aligned on the flanges 129. Alternatively, the "pine tree" fasteners 138 could be staggered along the longitudinal length of the flanges so that they would not interfere with each other when the inner shell is closed. A similar technique can be used with other low profile mechanical fasteners such as rivets.

Figure 6D:
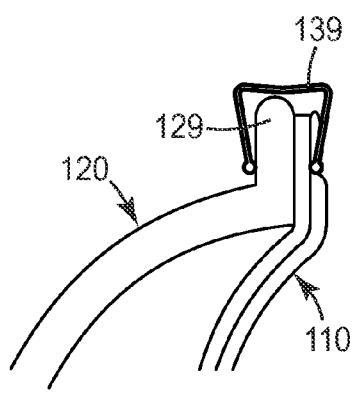
Figure 6E:
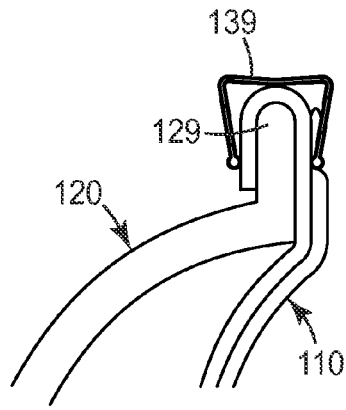

FIGS. 6D and 6E show how a spring clip 139 can be used to attach sealing member 110 to the inner shell 120. The sealing member can either be laid along one side of flange 129 (FIG. 6A) or folded over top of the flange and secured to the flange by placing the spring clip 139 over the sealing member and the flange 129 of the inner shell 120. The spring clips can be placed intermittently along the longitudinal length of the flange or a longer continuous clip may extend most or all of the length of the flange.

Alternative attachment methods for the sealing member 110 to the inner shell 120 include bonding, clamping, taping, stapling, and molding in-place. In an alternative embodiment, the sealing member may be directly attached to the inner wall of the inner shell.

Inner shell 120 can include structural features that create "pressure points" at or near critical sealing locations. In FIG. 2A, the structural features are in the form of pressure ridges 132, 134 disposed at the first end 122 and the second end 124, respectively, of inner shell 120. Pressure ridges 132, 134 help ensure adequate sealing at key locations around the perimeter of cables, device receptacles or housing inlets.

Inner shell 120 can have an external topography defining an inner shell profile and wherein the outer shell has an internal topography defining an outer shell profile such that the outer shell profile is similar to the inner shell profile. In a first exemplary embodiment shown in FIG. 1A, the inner shell has a tapered inner shell profile having a first diameter, d, at a first end 122 of the inner shell and a second larger diameter, D, at the second end 124 of the inner shell. The tapered inner shell profile can have a first cylindrical portion at the first end of the inner shell, a second cylindrical portion at the second end of the inner shell which can be joined to one another by a frustrated conical section. In an alternative aspect, inner shell 120 can have a cylindrical inner shell profile having substantially constant diameter along the entire length of the inner shell. Alternatively, the inner shell can have a continuously tapering inner shell profile, a bell shaped inner shell profile or other mechanical design so long as the close fitting outer shell may be slid over the inner shell (i.e. the diameter at one end of the inner shell must be greater than or equal to the diameter at the opposite end of the inner shell).

Figure 2B:
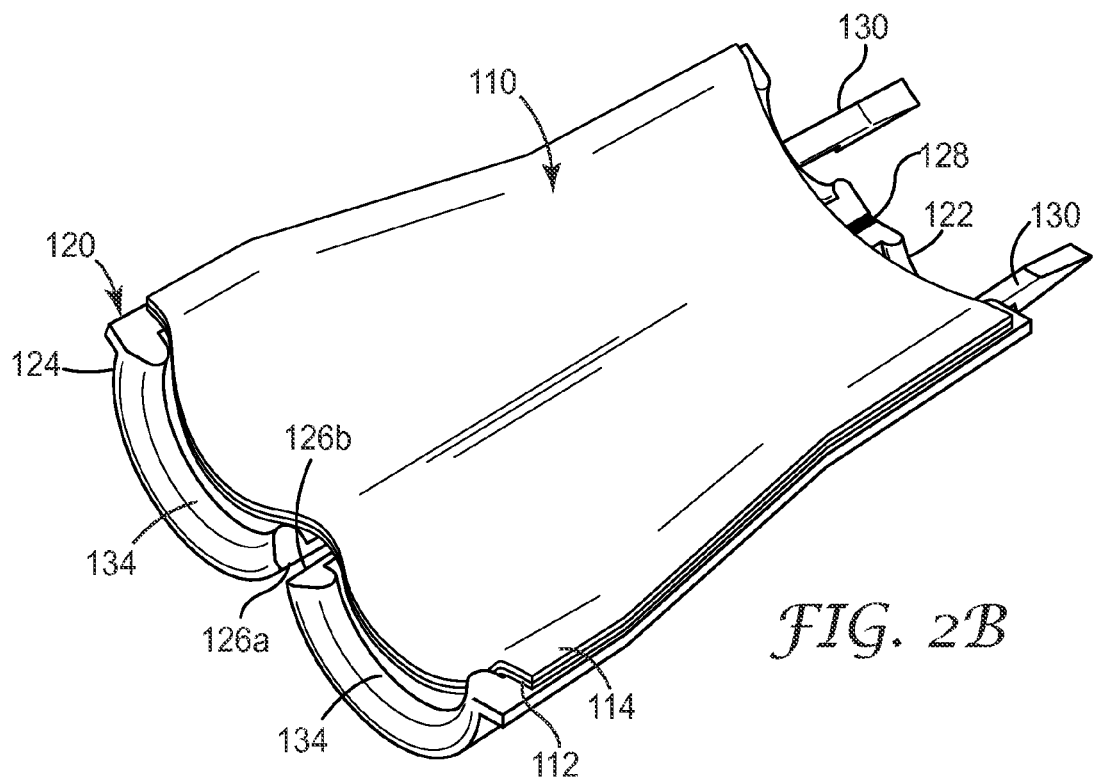

In the exemplary embodiment shown in FIG. 2B, the sealing member 110 can be a sheet sealing member 112 including a gel sealant material 114 coated on one of an elastomeric sheet and a volume compliant sheet. In an alternative aspect the sealing member can be an unsupported gel sealant material which can be directly disposed against the inner wall of the inner shell in a sufficient thickness to fill any air gaps around the cable connection being protected by the enclosure. In yet another aspect the unsupported gel material can be provided around the perimeter of the inner shell to provide an environmental barrier at these critical locations.

Advantageously, the sheet sealing member 112 can provide mechanical integrity to sealing member 110. The sheet sealing member can be used to attach to the housing and act as a support for the softer gel sealant material 114 that forms the seal at the cable/connector/inlet surface. The sheet sealing member can be a fabric (either woven or nonwoven), an elastomeric sheet including a rubber sheet or a plastic film, a volume compliant sheet such as a closed cell and/or open cell foam sheet, or a combination thereof (e.g. a fabric backing on a rubber sheet for instance). The sheet sealing member should be a material which is compatible with the gel sealant material used in the sealing member. Exemplary materials for the sheet sealing member include neoprene, polyurethanes, silicones, as well as crosslinked polymer materials. An exemplary sheet sealing member can be a closed cell neoprene foam having a nylon fabric face on one side that is available as item number 201400BN from Perfectex plus LLC (Huntington Beach, Calif.).

The gel sealant material provides a physical barrier to the entry of environmental contaminants to the regions being protected by the gel material. Typical gel sealant materials can include oil swollen, cross-linked polymer networks. The cross-links can be either due to physical association or chemicals bonds formed between the polymer chains within the network. Exemplary oil swollen gel materials can include oil-filled thermoplastic elastomeric rubbers (e.g. styrene/rubber/styrene block copolymers), room-temperature vulcanization, (RTV) and thermoset compositions, (e.g. silicones, epoxy, urethane/isocyanates, esters, styrene-butadiene rubber (SBR), ethylene propylene diene monomer (EPDM) rubber, nitrile and butyl rubbers, etc.), and radiation cured materials including e-beam and UV/Vis radiation sensitive formulations.

One exemplary gel sealant material can comprise 70 to 95 parts by weight of mineral oil dispersed in 5 to 30 parts by weight of thermoplastic elastomer.

The term mineral oil, as used herein, refers to any of various light hydrocarbon oils, especially distillates of petroleum. Typically, the mineral oil is a white mineral oil although other mineral oils may be used. White mineral oils are generally colorless, odorless or nearly odorless, and tasteless mixtures of saturated paraffinic and naphthenic hydrocarbons that span a viscosity range of 50-650 Saybolt Universal Seconds (5 to 132 centistokes) at 100° F. (38° C.). Nearly chemically inert, white mineral oils are essentially free of nitrogen, sulfur, oxygen and aromatic hydrocarbons. Exemplary mineral oils include KAYDOL oil available from Crompton Corporation (Middlebury, Conn.), DuoPrime 350 and DuoPrime 500 available from Citgo Petroleum Corporation (Houston, Tex.), Crystal Plus 200T and Crystal Plus 500T available from STE Oil Company, Inc. (San Marcos, Tex.). Typically, 70 to 95 parts by weight of mineral oil, or even more typically 85 to 93 parts by weight of mineral oil are used in combination with 7 to 15 parts by weight of the at least one thermoplastic elastomer.

In an alternative embodiment, the mineral oil can be replaced fully or in part by another petroleum based oil, a vegetable oil, or a modified version of either of these two oil types.

Suitable thermoplastic elastomers for use in sealant material include styrene-rubber-styrene (SRS) triblock copolymers, styrene-rubber (SR) diblock copolymers, styrene-rubber-styrene (SRS) Star copolymers and mixtures thereof. Exemplary styrene-rubber-styrene triblock copolymers include styrene-butadiene-styrene (SBS), styrene-isoprene-styrene (SIS), and partially or completely hydrogenated derivatives thereof, such as styrene-ethylene/butylene-styrene (SEBS), styrene-ethylene/propylene-styrene (SEPS), styrene-ethylene/ethylene/propylene-styrene (SEEPS), and combinations thereof. Examples of commercially available suitable SEBS block copolymers for use in the exemplary sealant material include trade designated "KRATON G-1651" and "KRATON G-1633" Block Copolymers, both of which are commercially available from Kraton Polymers (Houston, Tex.). Examples of commercially available suitable SR diblock copolymers include trade designated "KRATON G-1701" and "KRATON G-1702" Block Copolymers both of which are commercially available from Kraton Polymers (Houston, Tex.), and "SEPTON S 1020" High Performance Thermoplastic Rubber which is commercially available from Kuraray Company (Tokyo, Japan). Exemplary suitable SEPS and SEEPS block copolymers for use in the exemplary sealant material include trade designated "SEPTON S 4055" or "SEPTON S 4077" High Performance Thermoplastic Rubber which are commercially available from Kuraray Company (Tokyo, Japan). An exemplary SRS star copolymer is "SEPTON KL-J3341" also available from Kuraray Company (Tokyo, Japan). Additionally, suitable vinyl-rich block copolymers for use in the exemplary sealant material include "HYBRAR 7125" and "HYBRAR 7311" High Performance Thermoplastic Rubbers, which are also commercially available from Kuraray Company (Tokyo, Japan). A suitable maximum concentration of the block copolymer in the gel sealant material is about 30% by weight, based on the entire weight of gel sealant material.

Other additives which may be added to the exemplary gel sealing material of the current invention can include cure catalysts, stabilizers, antioxidants, biocides, colorants (e.g. carbon black, talc, other pigments, or dyes), thermally conductive fillers, radiation absorbers, flame retardants, etc. Suitable stabilizers and antioxidants include phenols, phosphites, phosphorites, thiosynergists, amines, benzoates, and combinations thereof. Suitable commercially available phenolic-based antioxidants include trade designated "IRGANOX 1035", "IRGANOX 1010", and "IRGANOX 1076" Antioxidants and Heat Stabilizers for wire and cable applications, commercially available from Ciba Specialty Chemicals Corp. (Tarrytown, N.Y.) and vitamin E based antioxidants such as α-tochopherol, commercially available from Sigma-Aldritch (St. Louis, Mo.). A suitable maximum concentration of stabilizers or antioxidants in the gel sealant material is about 1% by weight, based on the entire weight of the gel sealant material. When forming the gel sealant material, stabilizers and antioxidants may be dissolved or dispersed in the mineral oil prior to combining the diblock copolymer with the mineral oil.

The gel sealant material can be melted and coated onto the fabric-faced neoprene sheet (item number 201400BN available from Perfectex plus LLC, Huntington Beach, Calif.). In one exemplary aspect, the gel sealant is a mixture of 5% Kraton G1633 in Kaydol oil, with 0.2% Irganox 1010 antioxidant. The sealant material can be melted in a hot melt dispenser that has a reservoir temperature of about 170° C. to about 180° C. The melted sealant material is dispensed onto the sheet sealing member and coated to the desired thickness via a standard knife coating technique. Alternatively, extrusion overcoating, or other standard hot melt coating techniques may be used. The resulting sheets of material can be cut to the desired size after the sheet sealing member has been coated with the gel sealant material. In an alternative aspect, the sheet sealing member can be cut to size prior to application of the gel sealant material. In one alternative method, the cut sheet of the sheet sealing member can be inserted into a mold and the gel sealant material can be injected under pressure.

In an alternative aspect, the gel sealant is a mixture of 9% Kraton G1651 in Kaydol oil with 0.2% Irganox 1010 antioxidant and a trace amount (0.002%) of Raven 660R Carbon Black available from Columbian Chemicals Company (Marietta, Ga.). In another alternative aspect, the gel sealant is a mixture of about 5% Septon 54055 in Kaydol oil with 0.2% Irganox 1010 antioxidant and a trace amount (0.002%) of Raven 660R Carbon Black. In another alternative aspect, the gel sealant is a mixture of about 9% Kraton G1651 in Crystal Plus 500T oil, with 0.2% Irganox 1010 antioxidant and Raven 1200 Carbon Black available from Columbian Chemicals Company (Marietta, Ga.). In another alternative aspect, the gel sealant is a mixture of about 5% Kraton G1633 in Crystal Plus 500T oil, with 0.2% Irganox 1010 antioxidant. While in another alternative aspect, the gel sealant is a mixture of about 5% Septon 54055 in Crystal Plus 350T oil, with 0.2% Irganox 1010 antioxidant and a trace amount (0.002%) of Raven 660R Carbon Black. While yet another alternative gel sealant mixture includes of about 9% Septon 54077 in Crystal Plus 350T oil, with 0.2% Irganox 1010 antioxidant. Another exemplary gel sealant mixture includes 90.8% DuoPrime 500, 9% Kraton G1651 and 0.2% α-tochopherol. Yet another exemplary gel sealant mixture includes 90.5% DuoPrime 500, 9% Kraton G1651 and 0.5% α-tochopherol. It should be noted that the optimal process conditions of the gel sealant material may change based on the selected formulation, but should be easily derivable from the material properties and through routine experimentation.

The gel sealant material can be coated in to yield a final thickness of the gel sealant material of about 1.5 mm to about 5 mm thick on the sheet sealing member. In an exemplary aspect, the gel sealant material can be coated in an approximately 3 mm thick layer on the neoprene. The thickness of the gel sealant materials can be altered depending on the configuration of the enclosure and cable connection to be protected.

Figure 17:
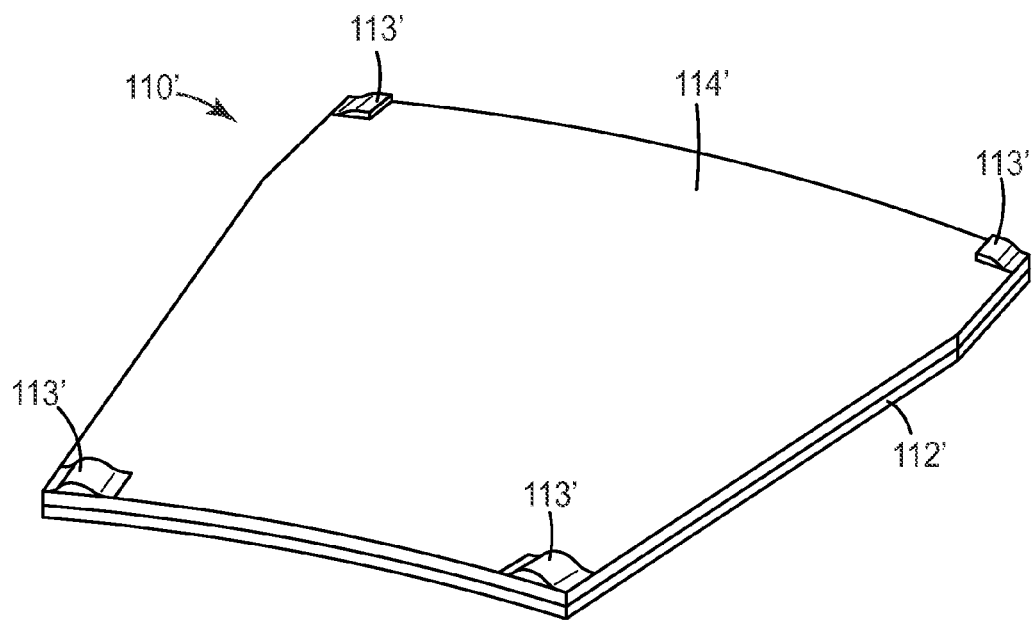
FIG. 17 is an isometric view of an exemplary sealing member according to an embodiment of the present invention.

In an alternative aspect shown in FIG. 17, the sealing member 110' can be a sheet sealing member 112' including a layer of gel sealant material 114' coated on one of an elastomeric sheet and a volume compliant sheet. Sealing member 110' can include gel nubs 113' which extend from the exposed surface of the gel sealant material. The gel nubs provide an extra amount of gel in critical sealing regions such as the exposed triple points where the two surfaces of the gel sealant material contact each other and the surface of the cable connection at either end of the exemplary enclosure. In an alternative aspect, the sealing material can have a gel ridge (not shown) extending along each longitudinal edge of the sealing member to provide an extra amount of gel along the longitudinal seam of the sealing member when it is closed around a cable connection.

Figure 3A:
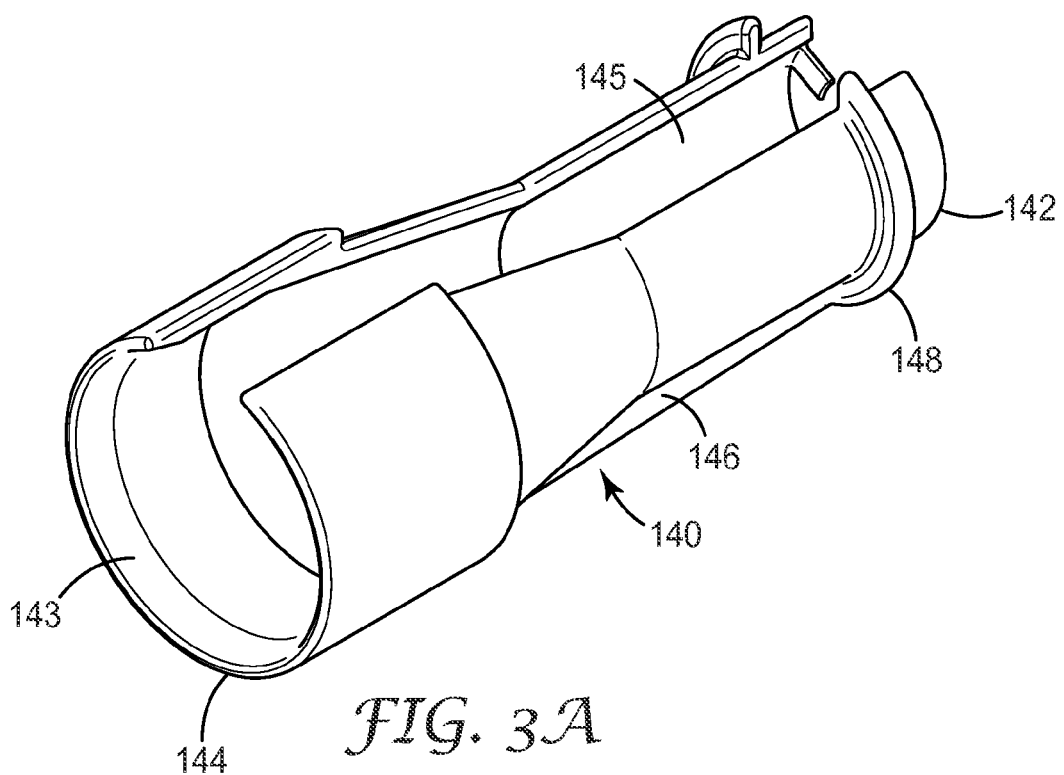
FIGS. 3A and 3B are two isometric views of an outer shell for the exemplary enclosure of FIGS. 1A and 1B.
Figure 3B:
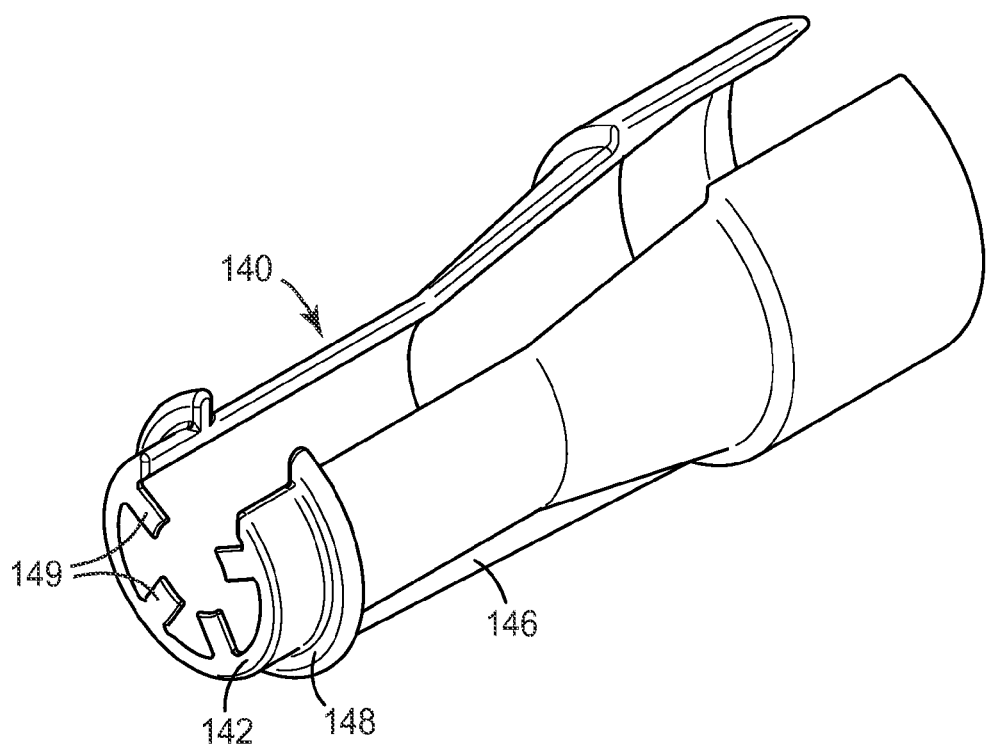

The outer shell 140 of the enclosure is shown in detail in FIGS. 3A and 3B. The outer shell imparts a radial compressive load to at least a portion of the inner shell. To accomplish this, the outer shell closely fits over at least a portion the inner shell. In a first embodiment shown in FIGS. 1A-1B and 3A-3B, the outer shell 140 is configured to closely fit over the inner shell 120 along a substantial portion of the inner shell. This provides a controlled and constant radial compressive force to the inner shell to create an environmental seal around the cable connection housed in enclosure 100.

Outer shell 140 can be a semi-rigid or rigid member that includes an opening 145 along the entire length of one side of the outer shell to permit clearance for the cable to be inserted into the outer shell as shown in FIGS. 3A and 3B. Alternatively, a cable to be connected can be threaded through a contiguous outer shell (i.e. no opening) prior to being connected to another cable housing or piece of equipment. Then once the connection is made and the inner shell in place, the contiguous outer shell can be slid over the inner shell to provide the radial compression needed to ensure an environmental seal around the cable connection. In one exemplary aspect, sealing member 110 is compressed from about 20% to about 65% at critical points in the enclosure, such as around the perimeter of the cable at the first and second ends of the enclosure and along the longitudinal seam of the inner shell. In an alternative aspect, the gel sealant material is compressed by about from about 40% to about 50%. The outer shell 140, when proper compression is achieved, can be locked in place with latch arms 130 provided as an integral part of the inner shell 120 as shown in FIG. 1B. The outer shell can be removed by the deflection of the latch arms to inspect or conduct maintenance of the cable connection and reapplied when the operation is complete.

Outer shell 140 can include a beveled entry region 143 at the first end 142 and/or the second end 144 of the outer shell to facilitate sliding the outer shell over the inner shell during installation of the enclosure as shown in FIG. 3A. Outer shell 140 can also include a track 146 to accommodate hinge 128 (shown in FIGS. 1A and 2A) on the inner shell 120 as required by the design of the inner shell. Alternatively, the outer shell can also include one or more tracks to accommodate the seam(s) where the inner shell meets itself to form a seal as will be described in additional detail with respect to FIG. 9.

Additionally, the outer shell 140 can include one or more strengthening ribs disposed either longitudinally or circumferentially along the exterior surface of the outer shell. FIGS. 3A and 3B show a single circumferential strengthening rib 148 disposed near the first end 142 of outer shell 140. In addition, circumferential strengthening rib 148 can be used as a gripping surface to facilitate removal of the outer shell during inspection or maintenance of the cable connection contained within the enclosure.

FIG. 3B is a view of the outer shell from the first end 142 there of. Outer shell can have a plurality of internal projections or flexible fins 149 disposed near the first end of the outer shell and extending from the interior surface of the outer shell. When the outer shell has been placed on the cable prior to assembling the enclosure or when it has been removed from the inner shell for inspection or maintenance procedures, the flexible fins 149 press against the sheath of the cable passing through the outer shell to keep the outer shell from sliding down or falling off the cable. This is especially important in aerial applications such as installations on antenna connections on cellular towers or other connections on vertical run lengths of cables.

Inner shell 120 and outer shell 140 can be made by various processes, for example, injection molding, blow molding, spin molding, extrusion molding, vacuum molding, rotational molding, and thermal forming. Embodiments of the inner shell and outer shell can be made from various materials, for example, aluminum, steel, metal alloys, and plastics, particularly injection molded thermoplastics, such as polyolefins, polyamides, polycarbonates, polyesters, polyvinyls, and other polymeric materials. Typical thermoplastics materials usable for the inner shell include polyamides (Nylon® 12, Nylon® 6,6, etc), polyolefins (for example, polyethylene (PE), polypropylene (PP) such as Slovalen PH91N available from Plastcom (Hallalova, Bratislava), Slovak Republic, Profax 8523 available from LyondellBasel (Rotterdam, Netherlands), and Borsoft SG220MO available from Borealis (Linz, Austria), and polybutylene (PB)), vinyl acetate, poly ethers, polysulfones, polystyrenes, polyvinylchloride (PVC), and copolymers and blends thereof. Typical materials usable for the outershell include filled and unfilled thermoplastic and thermoset materials, including polyolefins (for example, polyethylene (PE), polypropylene (PP) and polybutylene (PB)), vinyl acetate, polycarbonate, poly ethers, polysulfones, polystyrenes, PVC, diene rubbers, acrylonitrile butadiene styrene (ABS), polyamides, polybutadiene, polyether block amide (PEBA), polyetherimide, polyimide, polyurea, polyurethane (PUR), silicone, vinyl ester resins, phenolic resins, melamine and urea formaldehyde resins, fluorinated resins (e.g. PTFE) PEEK, polyesters, (polybutylphthalate, PET, etc.) and copolymers and blends thereof. Exemplary polycarbonate/polybutylphthalate blends that can be used to make the outer shell are Xenoy x4820 or Valox® 533 which are available from SABIC Innovative Plastics (Pittsfield, Mass.). In an alternative aspect, the outer shell can be made of a polyetherimide resin such as Ultem 1010 polyetherimide available from SABIC Innovative Plastics (Pittsfield, Mass.). In yet another exemplary aspect, the outer shell can be made of a semi-crystalline thermoplastic polyester such as Ertalyte® PET-P available from Quadrant (Johannesburg, South Africa).

Figure 4A:
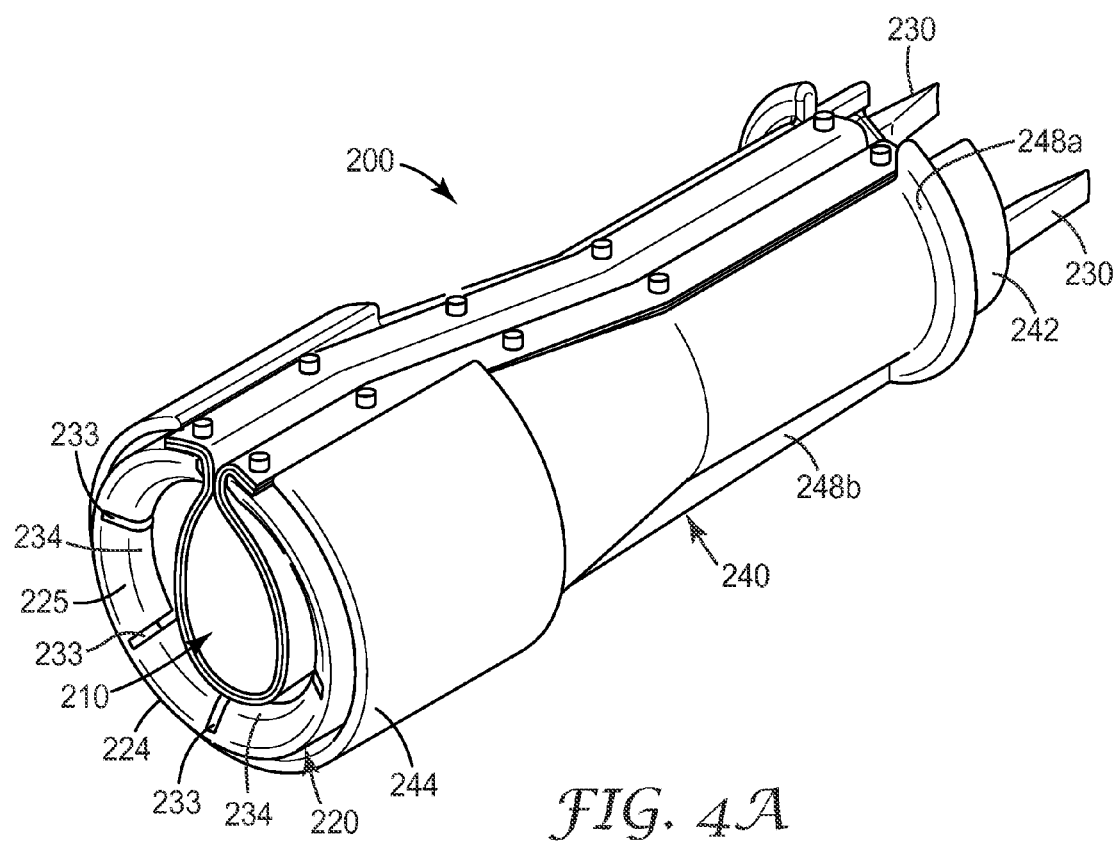
FIG. 4A is an isometric view of an alternative exemplary enclosure according to an embodiment of the present invention.
Figure 4B:
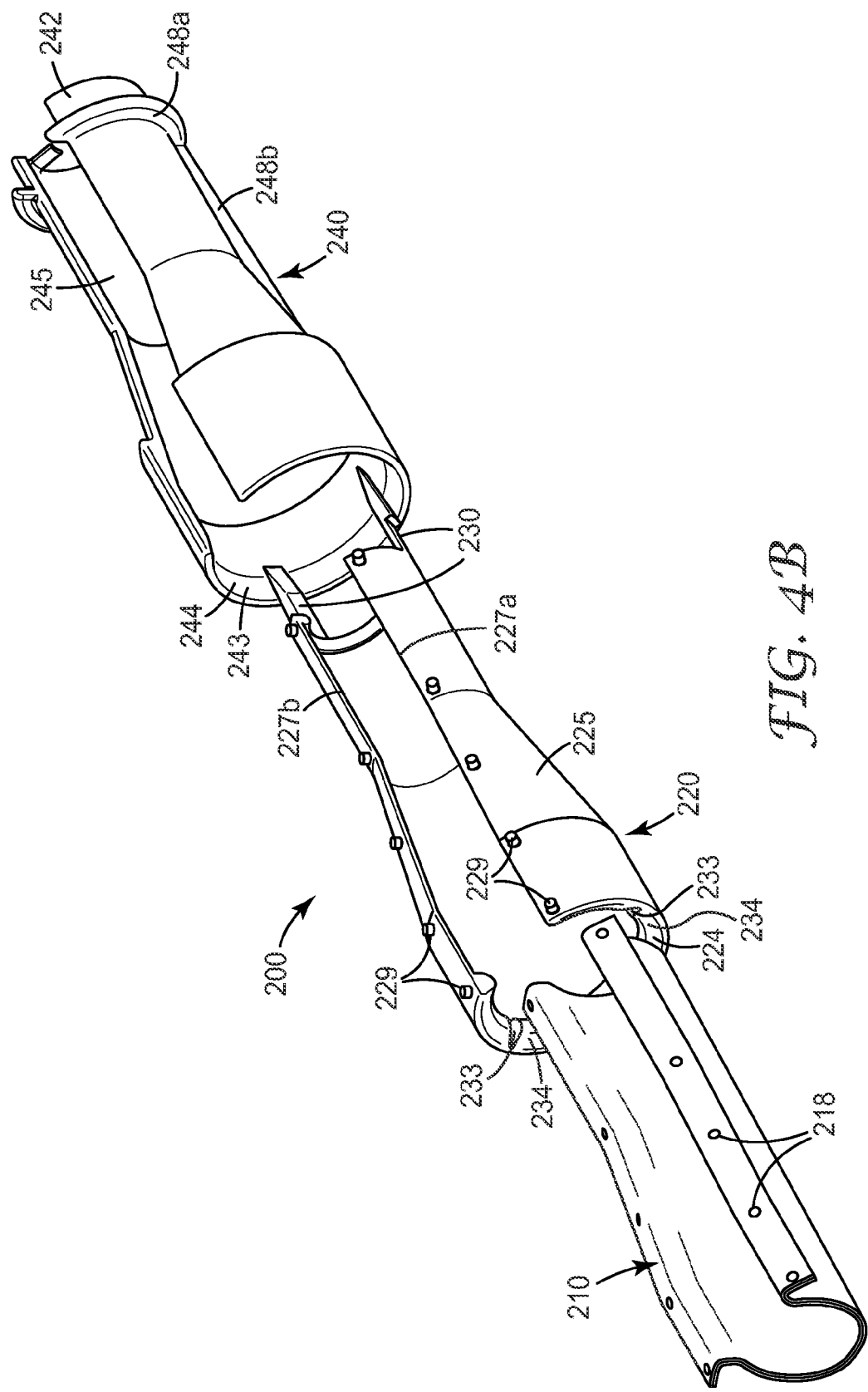
FIG. 4B is an exploded isometric view of an assembled enclosure of FIG. 4A.
Figure 4C:
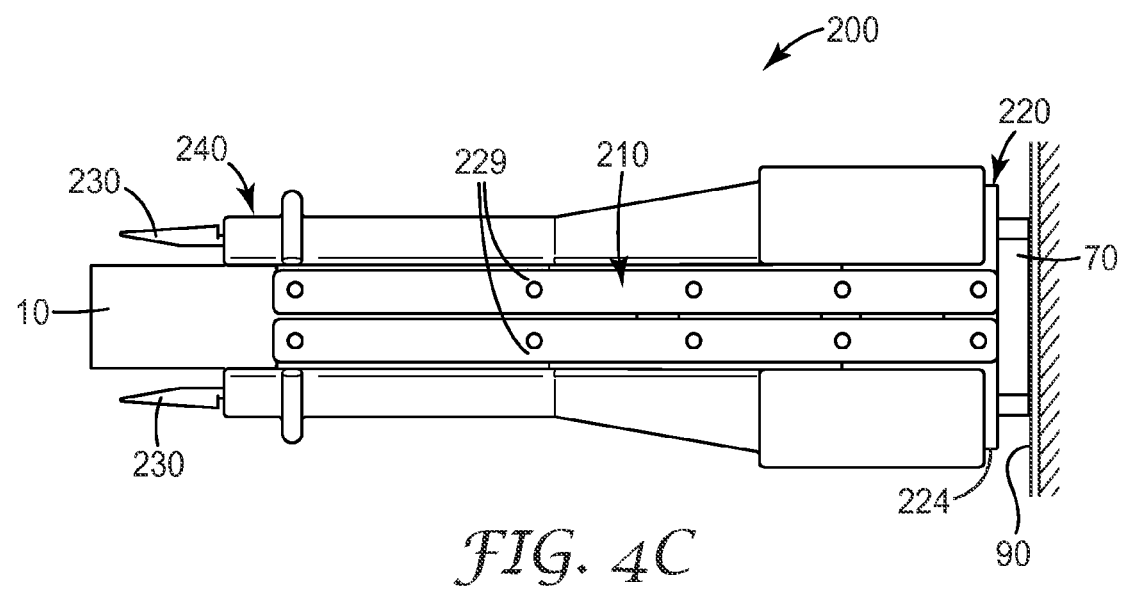
FIG. 4C is a top view of an assembled enclosure of FIG. 4A.
Figure 4D:
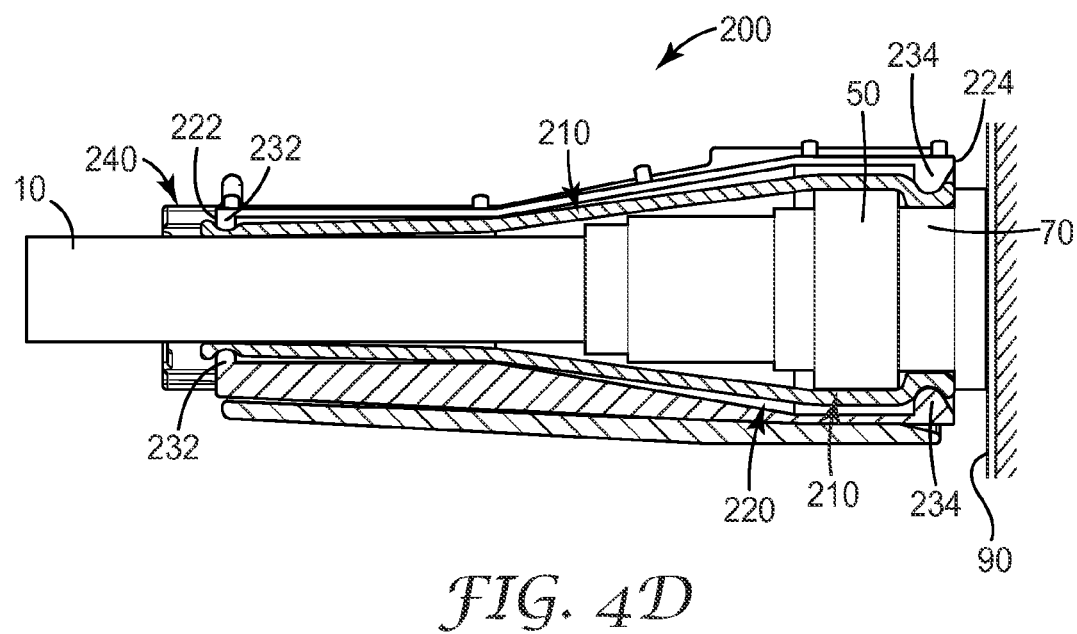
FIG. 4D is a cross sectional view of an assembled enclosure of FIG. 4A.

FIGS. 4A-4B show a second embodiment of an exemplary enclosure 200 for protecting a cable connection in an exploded and assembled condition, respectively. FIG. 4C shows a top view of enclosure 200 in an assembled state around a cable connection and FIG. 4D shows a cross sectional view of enclosure 200 in an assembled state around a cable connection. Enclosure 200 includes three parts: an inner shell 220, an outer shell 240, and sealing member 210 which can be disposed within the inner shell.

The inner shell 220 is effectively a holder for sealing member 210. The outer shell 240 can be placed over the inner shell to impart a radial compressive load to the inner shell. This radial load presses the sealing member into contact with the cable(s) and connector thereby creating an environmental seal. The outer shell, when proper compression is achieved, can be locked in place with latch arms 230 provided as an integral part of the inner shell 220. The outer shell can be removed by the deflection of the latch arms to inspect or conduct maintenance of the cable connection and reapplied when the operation is complete.

In an exemplary aspect shown in FIG. 4A, the inner shell 220 includes a single shell portion 225 that can enclose a cable connection when the inner shell is enclosed within outer shell 240.

As previously mentioned, the inner shell 220 is effectively a holder for sealing member 210. The sealing member can be attached to the inner shell by a series of posts projecting from the exterior surface of the inner shell along two longitudinal edges 227a, 227b of the inner shell. The posts mate with a series of holes 218 (FIG. 4B). In one exemplary aspect the posts 229 can have a slight mushroom shape such that the head of the post is slightly larger than the diameter of the shank of the post. The holes through sealing member should be slightly smaller than the diameter of the head of the post so that the sealing member is retained by the posts.

Inner shell 220 can include structural features that create "pressure points" at or near critical sealing locations. In FIGS. 4A and 4D, the structural features are in the form of segmented pressure ridges 232, 234 disposed at the first end 222 and the second end 224, respectively, of inner shell 220. The segmented pressure ridges can be separated by gaps 233 which will enhance the flexibility of the inner shell. The segmented pressure ridges 234 help ensure adequate sealing at key locations around the perimeter of cables, device receptacles or housing inlets.

In one exemplary embodiment, the sealing member 210 can be a sheet sealing member including a gel sealant material coated on one of an elastomeric sheet and a volume compliant sheet as described previously. In an alternative aspect the sealing member can be an unsupported gel sealant material which can be directly disposed against the interior surface of the inner shell in a sufficient thickness to fill any air gaps around the cable connection being protected by the enclosure. In yet another aspect the unsupported gel material can be provided around the perimeter of the inner shell to provide an environmental barrier at these critical locations. In this latter embodiment, the inner shell itself provides a portion of the water barrier function.

The outer shell 240 can be a semi-rigid or rigid member that includes an opening 245 along the entire length of one side of the outer shell to permit clearance for the cable 10 to be inserted into the outer shell as shown in FIGS. 4A-4C. Alternatively, a cable to be connected can be threaded through a contiguous outer shell (i.e. no opening) prior to being connected to another cable housing or piece of equipment. Then once the connection is made and the inner shell in place, the contiguous outer shell can be slid over the inner shell to provide the radial compression needed to ensure an environmental seal around the cable connection. The outer shell 240, when proper compression is achieved, can be locked in place with latch arms 230 provided as an integral part of the inner shell 220 as shown in FIGS. 4A and 4B. The outer shell can be removed by the deflection of the latch arms to inspect or conduct maintenance of the cable connection and reapplied when the operation is complete.

Outer shell 240 can include a beveled entry region 243 at the first end 242 and/or the second end 244 of the outer shell to facilitate sliding the outer shell over the inner shell during installation of the enclosure.

Additionally, the outer shell 240 can include one or more strengthening ribs disposed either longitudinally or circumferentially along the exterior surface of the outer shell. FIGS. 4A and 4B show the outer shell having a circumferential strengthening rib 248a disposed near the first end 242 of outer shell and a longitudinal strengthening rib 248b disposed opposite opening 245 in the outer shell. In addition, circumferential strengthening rib 248a can be used as a gripping surface to facilitate removal of the outer shell during inspection or maintenance of the cable connection contained within the enclosure.

FIGS. 4C and 4D show two views of enclosure 200 in an assembled condition around a cable connection, in particular a connection between a cable 10 and a receptacle 70 in the wall 90 of a housing. The cable is terminated with a connector 50 configured to mate with the receptacle 70 in the wall of a housing. FIG. 4D shows how the sealing member conforms roughly to the surface of the cable connection. The segmented pressure ridges 232, 234 of the inner shell 220 press and compress the sealing member against the cable and the receptacle in the wall of the housing, respectively. Additional pressure ridges can be added to the inner shell to increase the degree of contact between the sealing member and the cable connection if desired.

Figure 5A:
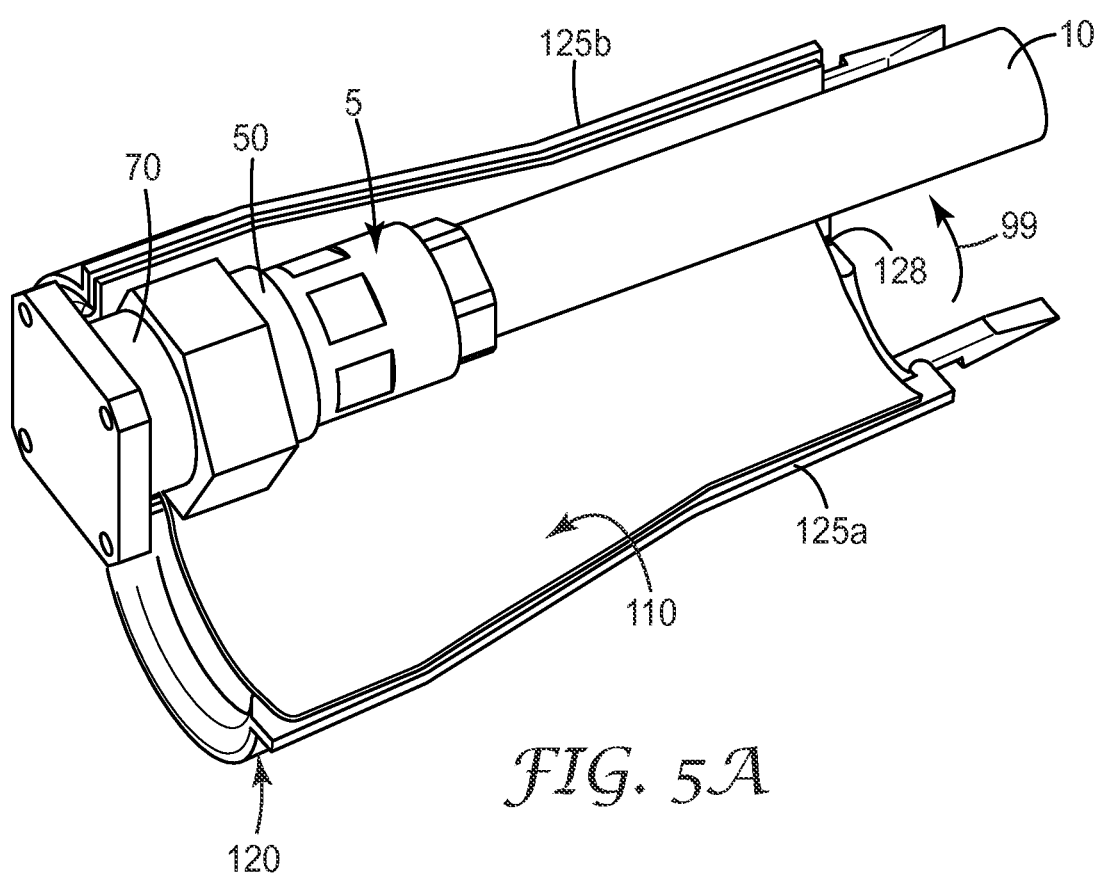
FIGS. 5A-5C illustrate an exemplary assembly method of an exemplary enclosure according to an embodiment of the present invention.
Figure 5B:
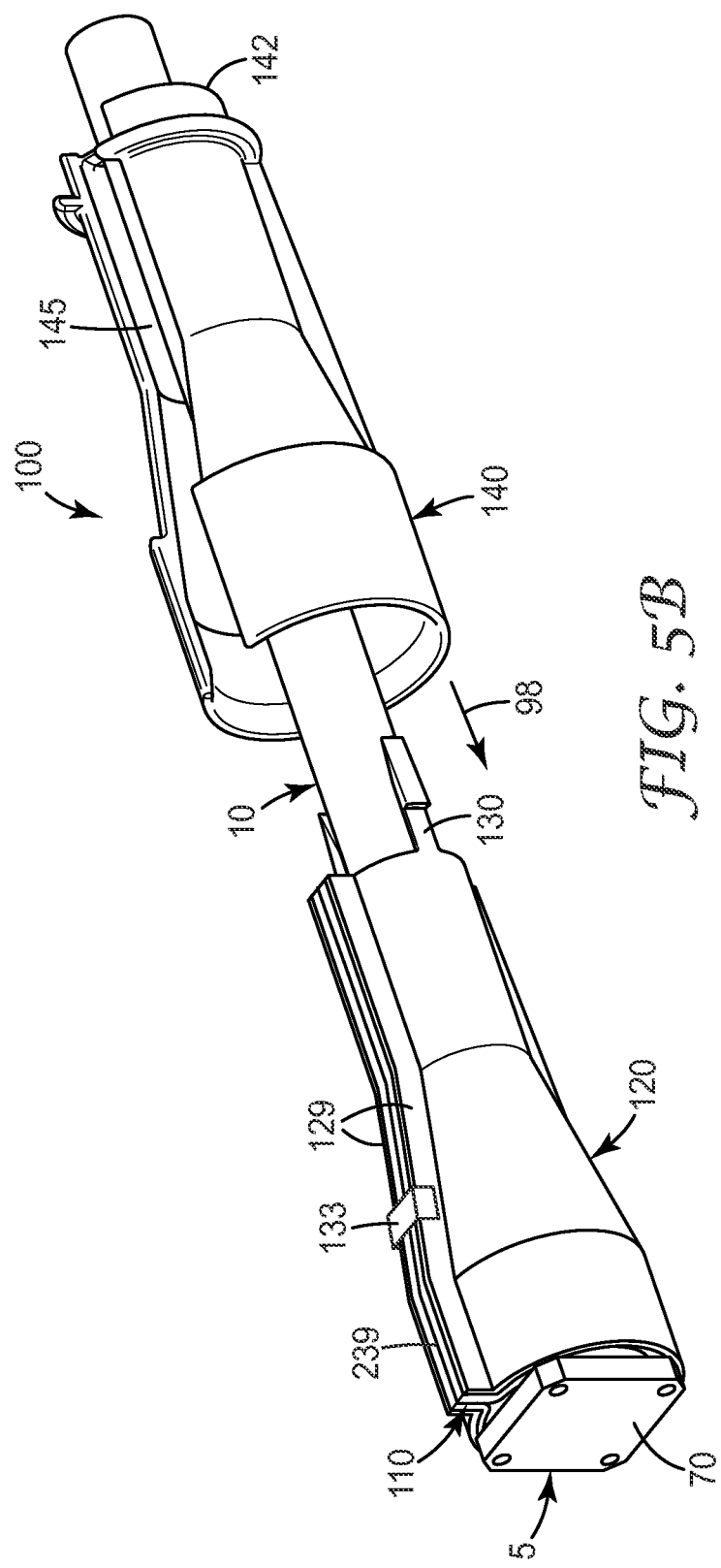
Figure 5C:
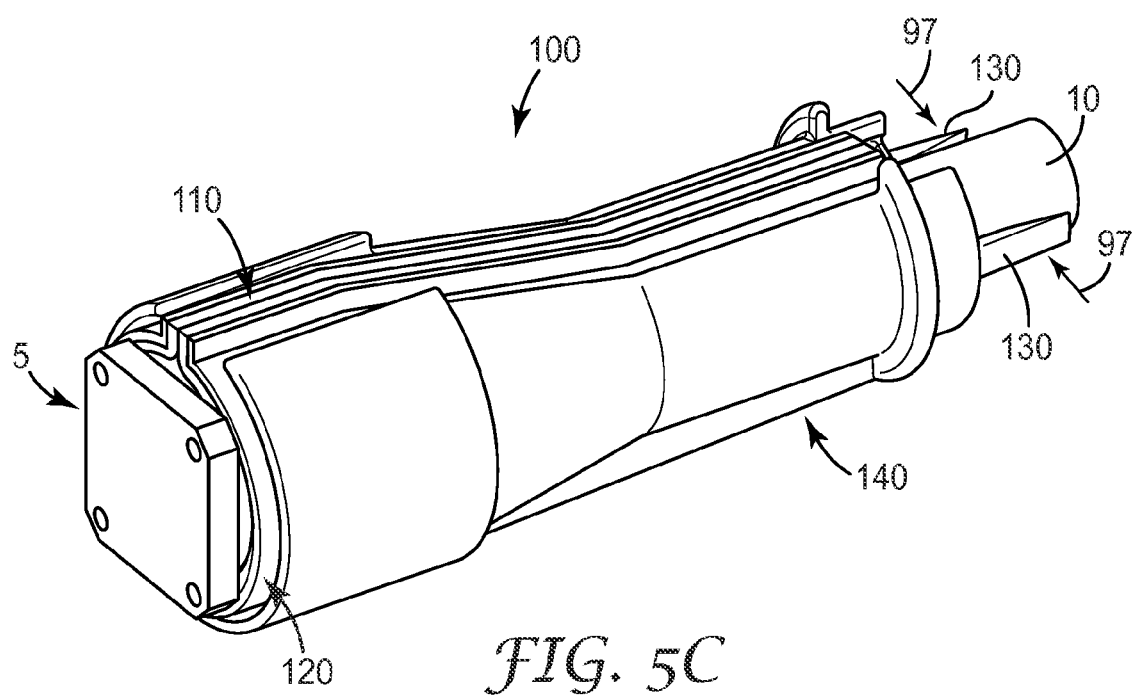

FIGS. 5A-5C show how the enclosure is placed around a cable connection, in particular a connection 5 between a cable 10 and a receptacle 70 in the wall (not shown) of a housing. The cable connection 5 is positioned in shell portion 125b of inner shell 120 and pressed against sealing member 110. Shell portion 125a is rotated about the pivot axis of hinge 128 to close the inner shell as shown by arrow 99 in FIG. 5A forming a seam 239 the second longitudinal edges or flanges of the inner shell. A temporary securing device or clasp 133 can be attached to the flanges 129 of inner shell 120 to keep the inner shell closed until the outer shell can be positioned over the inner shell. This is especially advantageous in high density cable connection installations in which it may be desirable to place the inner shell around all of the adjacent cable connections before positioning the outer shells over their respective inner shells to complete the assembly of the enclosures.

The outer shell 140 is positioned over cable 10 by sliding the cable through opening 145 in the outer shell as shown in FIG. 5B. Alternatively, the outer shell can be positioned around the cable prior to placing the cable connection in the inner shell. Internal projections or flexible fins (149 in FIG.

3B) extending from the interior surface of the outer shell can press against the sheath of the cable passing through the outer shell to keep the outer shell from sliding down the cable while the inner shell is positioned around the cable connection.

The outer shell 140 is slid over the inner shell as shown by arrow 98 in FIG. 5B until latch arms 130 engage with first end of the outer shell to complete the installation of enclosure 100 as shown in FIG. 5C.

The outer shell can be removed by the deflection of the latch arms as shown by arrows 97 in FIG. 5C to inspect or conduct maintenance of the cable connection and reapplied when the operation is complete. The inner shell can be opened to reveal the cable connection 5.

Figure 7:
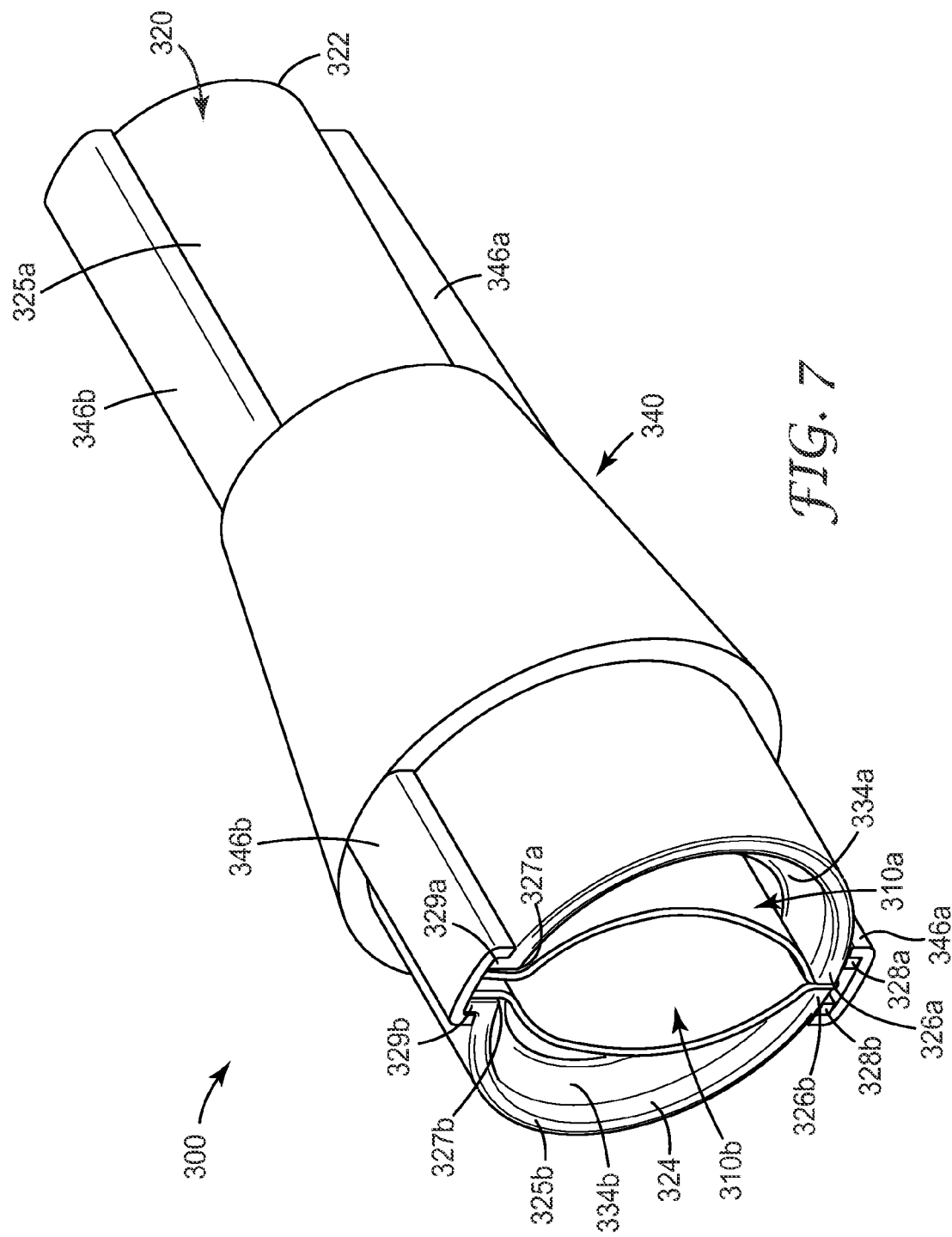
FIG. 7 is an isometric view of another exemplary enclosure according to an embodiment of the present invention.

FIG. 7 shows a third embodiment of an exemplary enclosure 300 for protecting a cable connection in an exploded and assembled condition, respectively. Enclosure 300 includes three parts: an inner shell 320, an outer shell 340, and two sealing members 310*a*, 310*b* which can be disposed within the inner shell.

In the exemplary aspect shown in FIG. 7, the inner shell 320 can include two separate shell portions 325*a*, 325*b* that can enclose a cable connection when the two shell portions are assembled together. As one of the primary functions of the inner shell 320 is effectively a holder for sealing members, sealing member 310*a* can be attached to shell portion 325*a* and sealing member 310*b* can be attached to shell portion 325*b*. Attachment methods for the sealing members 310*a*, 310*b* to shell portions 325*a*, 325*b*, respectively, of inner shell 320 can include adhesive bonding, thermal welding, clamping, taping, sewing, stapling, mechanically connecting, and molding in-place. In an alternative embodiment, the sealing member may be directly attached to the inner wall of the inner shell.

The outer shell 340 can be placed over the inner shell to impart a radial compressive load to the inner shell. This radial load presses the sealing member into contact with the cable(s) and connector thereby creating an environmental seal.

In an exemplary aspect shown in FIG. 7, the inner shell 320 can include two shell portions 325*a*, 325*b* that can enclose a cable connection when the two shell portions are assembled together. The shell portions 325*a*, 325*b* can have first flanges 328*a*, 328*b* extending perpendicular to the first two longitudinal edges 326*a*, 326*b* of the shell portions, respectively and can have second flanges 329*a*, 329*b* flanges extending perpendicular to the second two longitudinal edges 327*a*, 327*b* of the shell portions, respectively.

Inner shell 320 can include structural features that create "pressure points" at or near critical sealing locations. The structural features are in the form of pressure ridges 334*a*, 334*b* disposed at the first end 322 (not shown) and the second end 324, respectively, of shell portions 325*a*, 325*b*, respectively. Pressure ridges 334*a*, 334*b* help ensure adequate sealing at key locations around the perimeter of cables, device receptacles or housing inlets.

Sealing members 310*a*, 310*b* of the present embodiment can be sheet sealing members including a gel sealant material coated on one of an elastomeric sheet and a volume compliant sheet as previously described. In an alternative aspect the sealing member can be an unsupported gel sealant material which can be directly disposed against the interior surface of the inner shell in a sufficient thickness to fill any air gaps around the cable connection being protected by the enclosure. In yet another aspect the unsupported gel material can be provided around the perimeter of the inner shell to provide an environmental barrier at these critical locations.

The outer shell 340 can be a semi-rigid or rigid member that includes a pair of tracks 346*a*, 346*b* that engage with the first and second flanges 328*a*, 328*b* and 329*a*, 329*b* on shell portions 325*a*, 325*b* of inner shell 320 to secure the inner shell in a closed state. The outer shell 340 can be threaded onto a cable prior to being connected to another cable housing or piece of equipment. Then once the cable connection is made and the inner shell in place, outer shell 340 can be slid over the inner shell to secure the inner shell in a closed state and to create an environmental seal around the cable connection.

Figure 8:
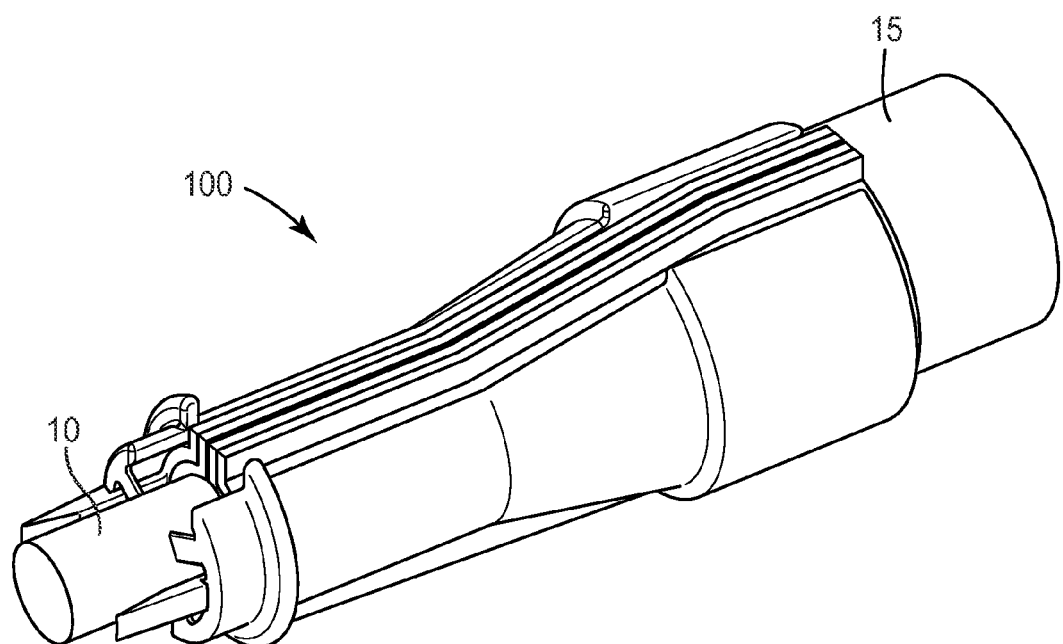
FIG. 8 is an isometric view showing an alternative use of an exemplary enclosure according to an embodiment of the present invention.

FIG. 8 shows the exemplary enclosure 100 assembled around a cable connection between two cables. In the aspect shown in FIG. 8, the cable connection is between two cables having different diameters, a small diameter cable 10 and a large diameter cable 15. In this aspect, the profiles of the inner shell 120 and the outer shell 140 have a tapered shape. In an alternative aspect, the cables could be of the same diameter in which case a cylindrical profile may be preferred.

Figure 10:
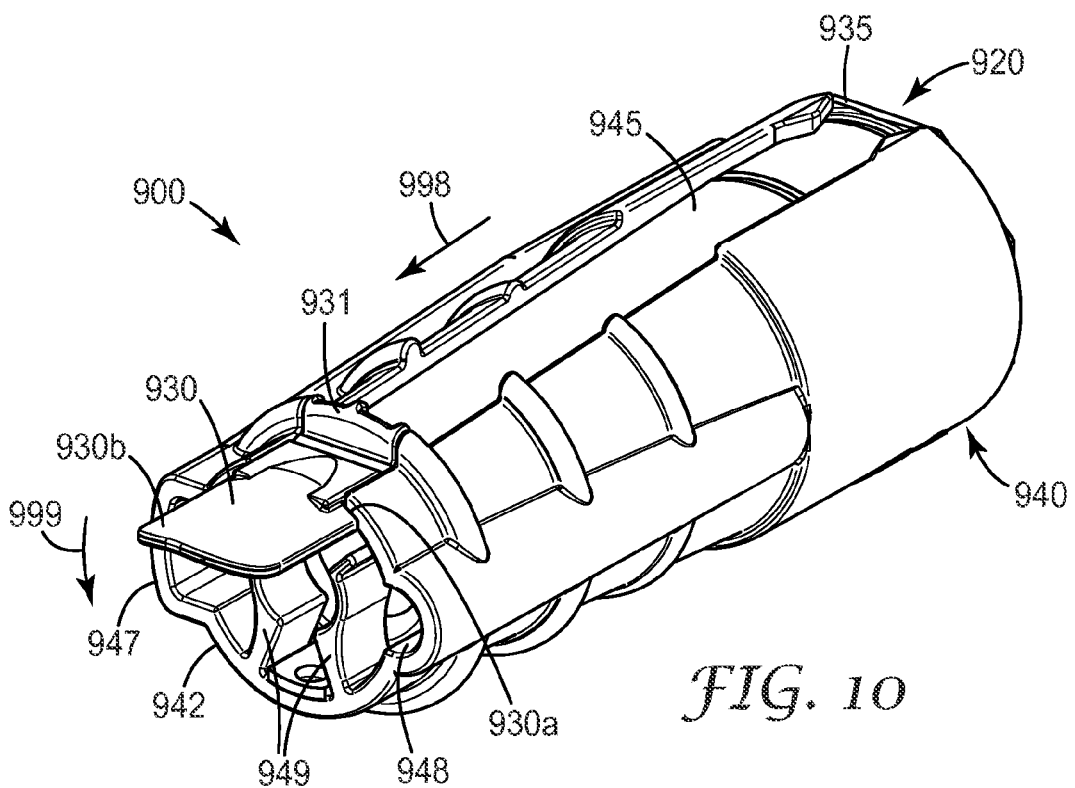
FIG. 10 is an isometric view of yet another exemplary enclosure according to an embodiment of the present invention.
Figure 11:
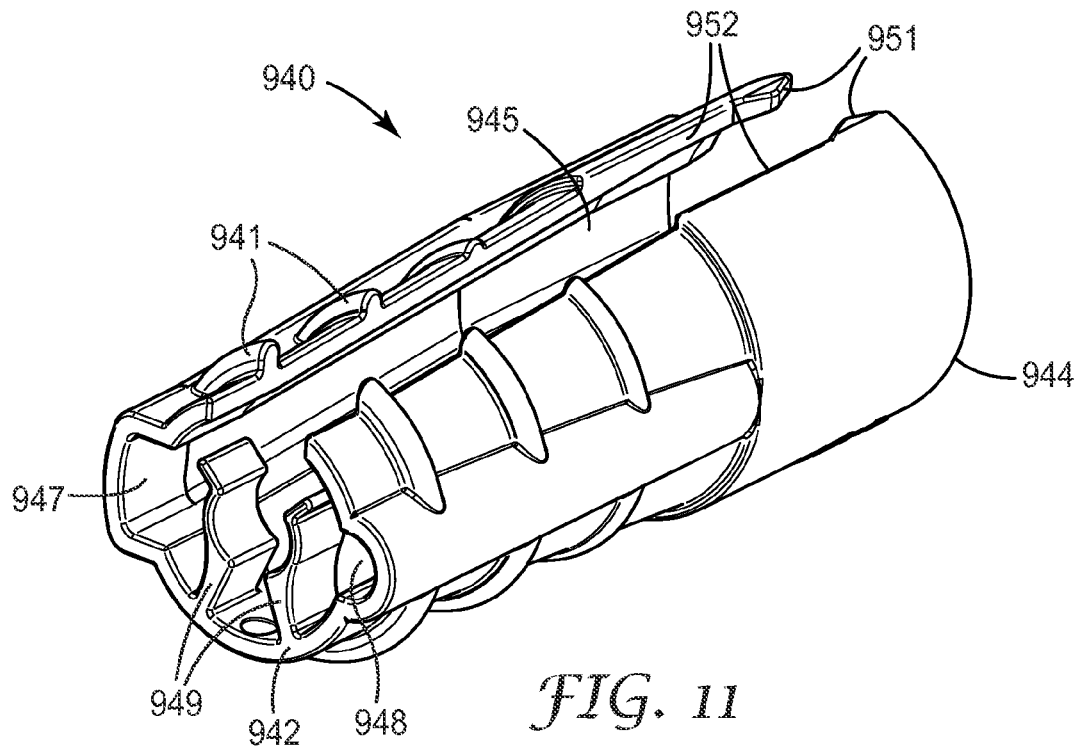
FIG. 11 is an isometric view of an outer shell for the exemplary enclosure of FIG. 10.
Figure 12A:
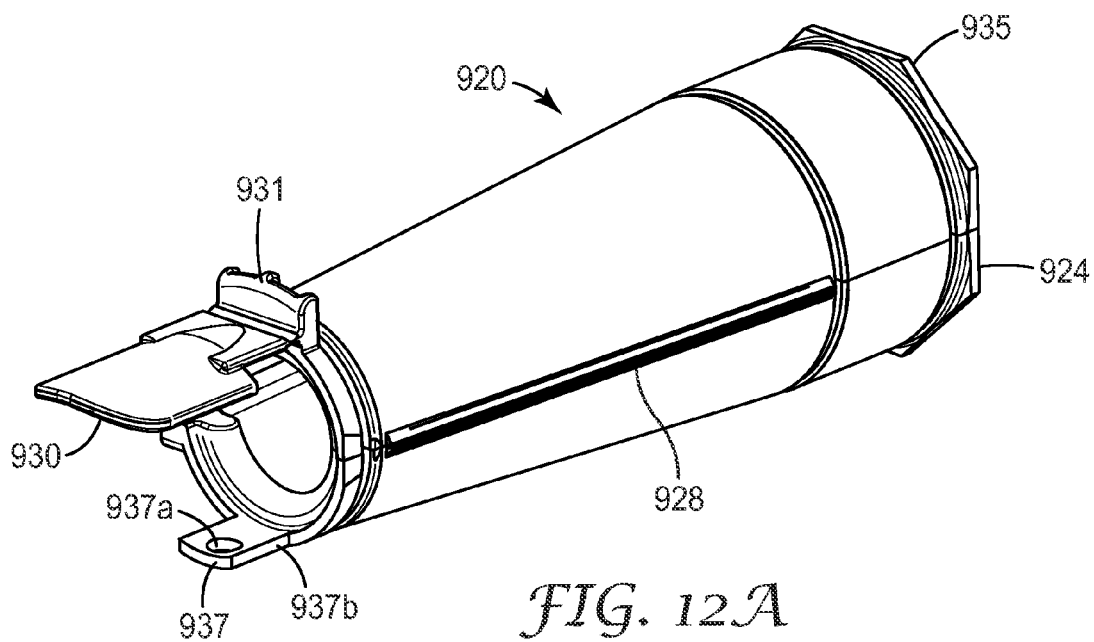
FIGS. 12A and 12B are two isometric views of an inner shell for the exemplary enclosure of FIG. 10.
Figure 12B:
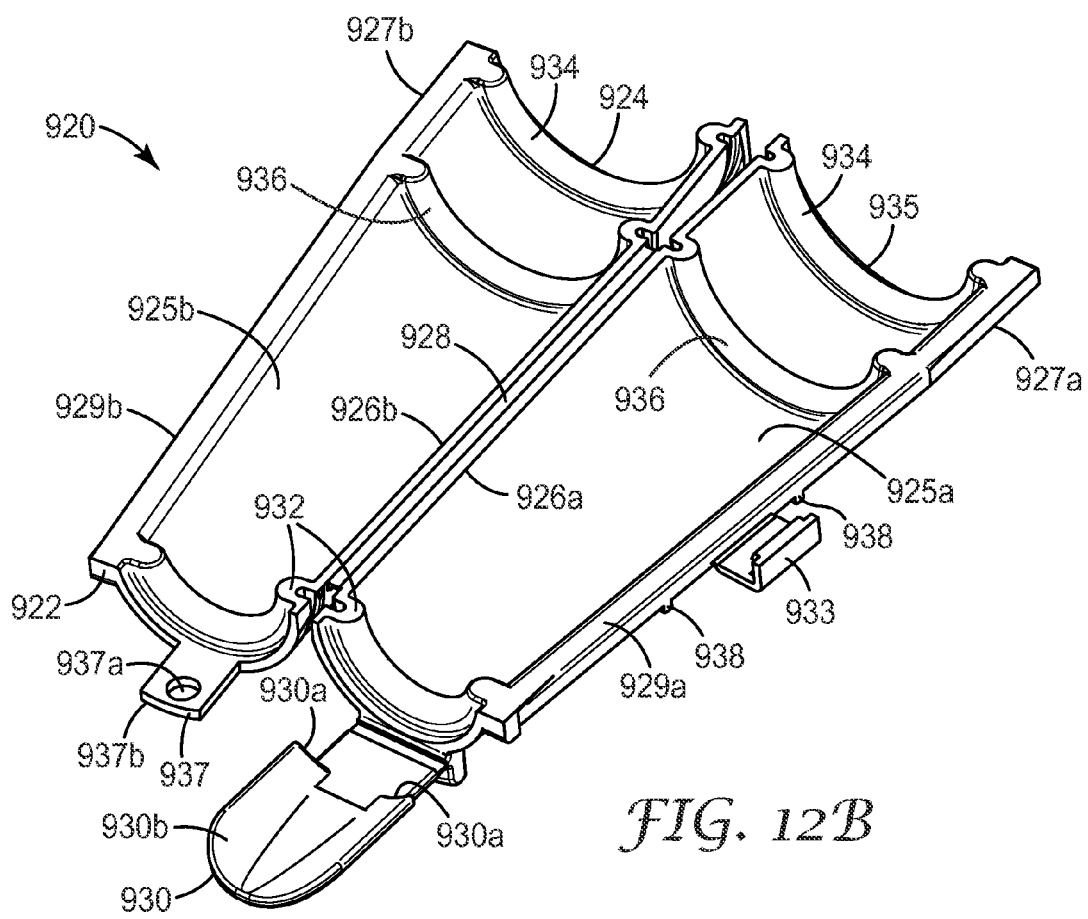

FIG. 10 shows another embodiment of an exemplary enclosure 900 for protecting a cable connection which is illustrated in an assembled condition, respectively. Enclosure 900 includes three parts: an inner shell 920, an outer shell 940, and sealing member (not shown) which can be disposed within the inner shell. FIG. 11 shows an exemplary view of outer shell 940 and FIGS. 12A and 12B show two exemplary views of inner shell 920.

Outer shell 940 can be a semi-rigid or rigid member that includes an opening 945 along the entire length of one side of the outer shell to permit clearance for the cable to be inserted into the outer shell. Outer shell 940 can additionally include one or more external ribs 941 to reinforce the outer shell at key locations along the length of the enclosure.

Outer shell 940 can have a plurality of internal projections or profiled fingers 949 disposed near the first end 942 of the outer shell and extending from the interior surface of the outer shell. When the outer shell has been placed on the cable prior to assembling the enclosure or when it has been removed from the inner shell for inspection or maintenance procedures, the profiled fingers 949 press against the sheath of the cable passing through the outer shell to keep the outer shell from sliding down or falling off the cable. This is especially important in aerial applications such as installations on antenna connections on cellular towers or other connections on vertical run lengths of cables.

In an exemplary aspect, the outer shell can further include a pair of retention nubs 951 located on the second end 944 of longitudinal edges 952 of opening 945. The retention nubs narrow the width of opening 945 between the nubs and can prevent the outer shell from slipping off the cable once it has been inserted through the opening.

The inner shell 920 is effectively a holder for the sealing member. The inner shell includes "pressure points", which will be described in additional detail below, to ensure adequate sealing at key locations when the inner shell and sealing member are placed around a cable connection.

The outer shell 940 can be placed over the inner shell to impart a radial compressive load to the inner shell. This radial load presses the sealing member into contact with the cable(s) and connector thereby creating an environmental seal. The outer shell can be a rigid member that includes an opening along the entire length of one side to permit clearance for the cable to be inserted into the outer shell. The outer shell, when proper compression is achieved, can be locked in place with a securing device, such as latch arm 930 which can be provided as an integral part of the inner shell.

Latch arm 930 includes lips 930a (FIG. 12B) which engage with the first end 942 of outer shell 940 is disposed over the inner shell as shown in FIG. 10.

Advantageously, exemplary enclosure 900 can be opened to expose the cable connection for inspection or maintenance and then reinstalled over the connection when the inspection or maintenance is complete. For example, outer shell 940 can be removed from the inner shell 920 by the deflection of latch arm 930. Tab 930b can be depressed as indicated by arrow 999 to disengage the lips 930a of latch arm 930 to allow the outer shell to be removed from the inner shell in the direction as indicated by arrow 998 in FIG. 10. Once the outer shell has been removed, the inner shell can be opened and the sealing member separated to reveal the cable connection.

In an exemplary aspect shown in FIGS. 12A and 12B, inner shell 920 can include two shell portions 925a, 925b that can enclose a cable connection when the two shell portions are assembled together. The shell portions 925a, 925b can be connected by a hinge 928 along a first longitudinal edge 926a, 926b of each shell portion. Hinge 928 can be a living hinge or any other conventional low profile hinge structure such as a barrel hinge. Hinge 928 may extend along the entire first longitudinal edges of shell portions, or may extend along only a portion of first longitudinal edges 926a, 926b of shell portions 925a, 925b, respectively as shown in FIG. 12B. The hinge allows the inner shell to be opened so that it can be easily placed around the cable connection and then closed to enclose the cable connection.

As previously mentioned, the inner shell 920 can effectively hold the sealing member (not shown) as previously disclosed. The sealing member can be attached to the inner shell along the second two longitudinal edges 927a, 927b of the inner shell. The sealing member can be attached to the flange by an adhesive, a thermal weld, stitched, or by a mechanical fastening system.

Figure 13A:
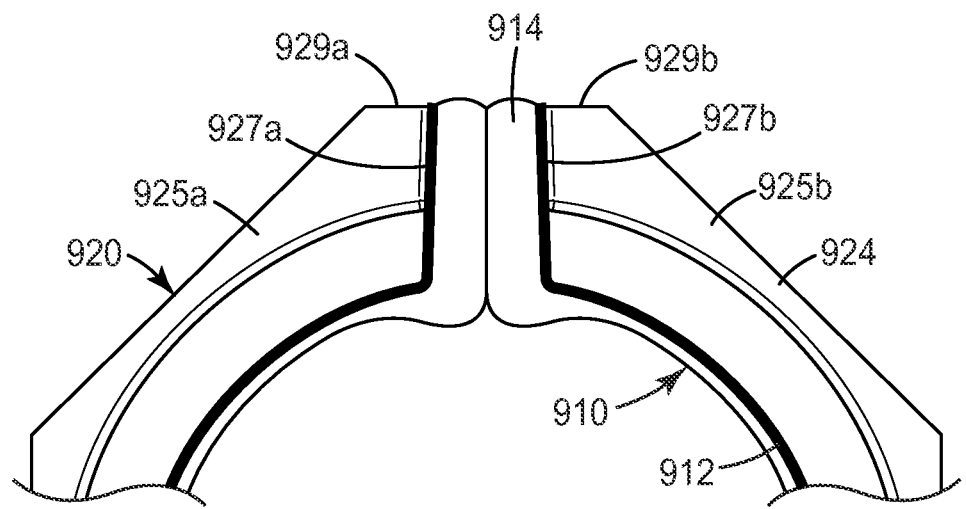
FIGS. 13A and 13B are two schematic end views of the exemplary enclosure of FIG. 10.
Figure 13B:
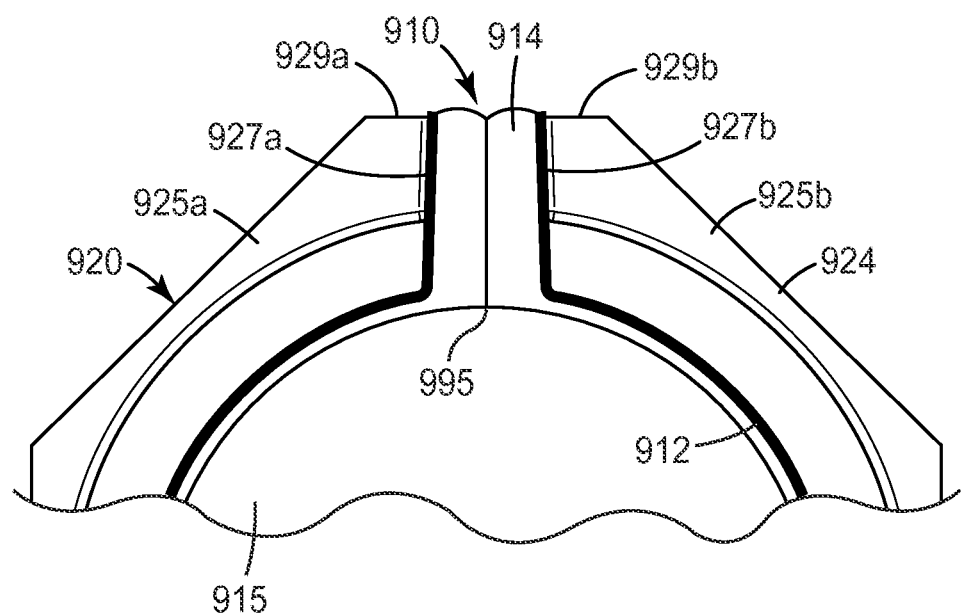

FIGS. 13A and 13B are partial schematic end views of the second end 924 of inner shell 920 showing the sealing member in a compressed state. FIG. 13B shows how the sealant material seals around a cable 915 and FIG. 13A shows the compression of the sealant material in the absence of a cable. In an exemplary aspect shown in detail in FIGS. 13A and 13B, the second longitudinal edges can be inclined toward each other such that the second longitudinal edges 927a, 927b of shell portions 925a, 925b are further apart close to cable 915 and become closer together away from the cable. Inclining the second two longitudinal edges 927a, 927b in this way allows the gel sealant material 914 coated on sheet sealing member 912 of sealing member 910 to be pressed inward towards the interior of the inner shell as shown in FIG. 13A when the outer shell imparts the radial compressive load to the inner shell. For example, the sealing member can be compressed by 50% along a line between the top of the flanges 929a, 929b forming the second longitudinal edges 927a, 927b (i.e. furthest away from cable 915 in FIG. 13B) and by 45% along a line between the bottom of the flanges 929a, 929b forming the second longitudinal edges 927a, 927b (i.e. nearest to cable 915 in FIG. 13B cable). This differential pressure causes the gel to be pushed in to the enclosure. This pushing of gel sealant material can provide enhanced sealing of the closure at the triple point 995 (i.e. the junction of the two interfaces of the sealing member and the cable) as shown in FIG. 13 B.

As previously described, inner shell 920 can include structural features that create "pressure points" at or near critical sealing locations. In FIG. 12B, the structural features are in the form of pressure ridges 932, 934 disposed at the first end 922 and the second end 924, respectively, of inner shell 920. Pressure ridges 932, 934 help ensure adequate sealing at key locations around the perimeter of cables, device receptacles or housing inlets.

Figure 16:
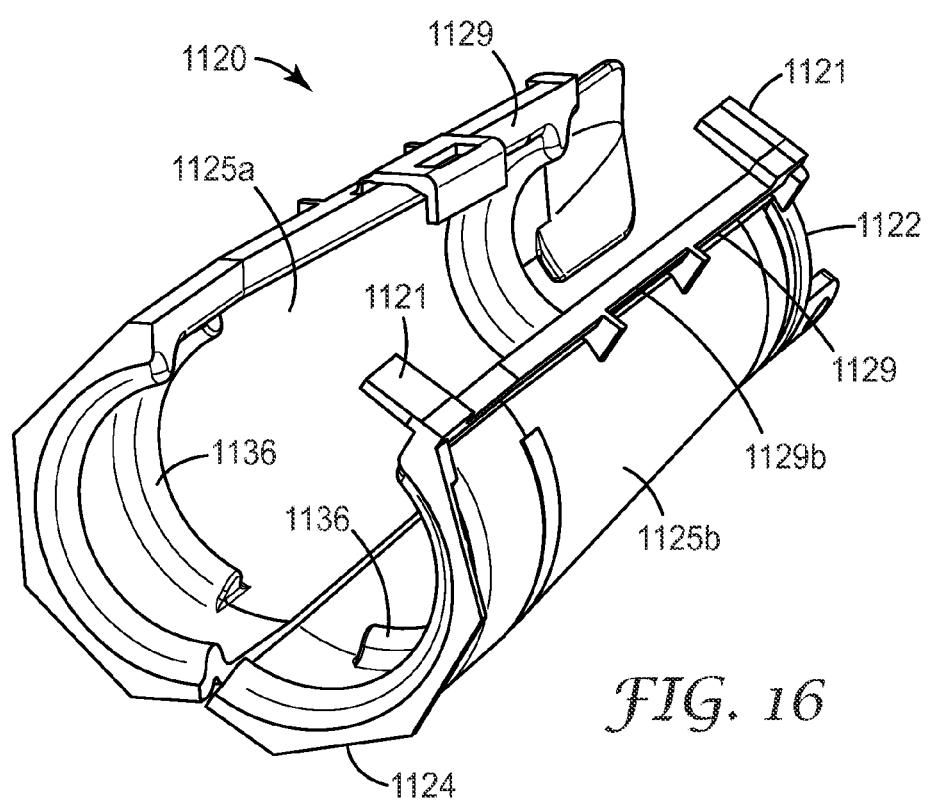
FIG. 16 is an isometric view of another exemplary inner shell according to an embodiment of the present invention.

Inner shell 920 can further include an additional ridge or other structure to serve as a nut stop 936. Thus, the nut of the cable connection will be positioned between pressure ridge 934 and nut stop 936 to ensure proper positioning of the cable connection within the exemplary enclosure. The nut stop can be formed around a substantial portion of the circumference of the inner shell as shown in FIG. 12B. Alternatively, the nut stop 1136 can form a discontinuous ring around the inner circumference of the inner shell 1120 as shown in FIG. 16. Nut stops 1136 are ridges formed on the inside surface of shell portions 1125a, 1125b of inner shell 1120 and extending only a portion of the way around the inside circumference of each shell portion. The exemplary embodiment shown in FIG. 16 shows a single nut stop disposed in each shell portion. Alternatively, multiple shorter nut stops may be positioned in each shell portion around the inner circumference of the inner shell and would be an obvious adaptation that would fall within the scope of the current invention.

Referring to FIG. 12A, the inner shell 920 further includes a shell stop 935 formed adjacent to the second end of the inner shell and extending from the external surface of the inner shell. Shell stop 935 prevents the outer shell from being slid too far forward when the outer shell is positioned over the inner shell.

The inner shell can further include a keying feature 931 which extends from the external surface of the inner shell. The keying feature fits within opening 945 in outer shell as shown in FIG. 10. Keying feature 931 ensures that the outer shell is disposed in the proper orientation over the inner shell.

A temporary securing device or clasp 933 can be integrally formed along one of the second longitudinal edges 927a or 927b of the inner shell 920. The clasp is connected to the second longitudinal edges by a living hinge. The clasp is designed to temporarily close the inner shell during installation until the outer shell can be positioned over the inner shell. This is especially advantageous in high density cable connection installations in which it may be desirable to place the inner shell around all of the adjacent cable connections before positioning the outer shells over their respective inner shells to complete the assembly of the enclosures.

Optionally, the inner shell can include a securing feature 937 as shown in FIGS. 12A and 12B. The securing feature can be a hole 937a formed in a projection 937b. A cable tie or cable lock can be inserted through the securing feature in the inner shell and a corresponding hole (not shown) in the outer shell to secure the inner shell and the outer shell together when the outer shell is disposed over the inner shell.

In another exemplary aspect, inner shell can include a plurality of pressure nubs 938 disposed on the exterior surface of flanges 929a, 929b to ensure optimal compression on the sealing member along the longitudinal seam of the inner shell.

In another exemplary aspect the inner shell can include one or more shims extending from one or both of the flanges 1129 which extend generally perpendicularly from the second two longitudinal edges of each shell portion 1125a, 1125b of inner shell 1120 shown in FIG. 16. The shims can ensure proper positioning of the inner shell within the outer shell when the enclosure is assembled over a cable connection. In the exemplary embodiment shown in FIG. 16, the inner shell has two shims 1121 extending from flange 1129b at the first end 1122 and the second end 1124 of the inner shell. When the shims are placed at the first and second ends of the inner shell in this manner, the shims provide the added advantage of providing a containment surface to concentrate the gel sealing material where it is needed to ensure an adequate level of environmental protection around the cable connection at the ends of the enclosure.

Figure 18A:
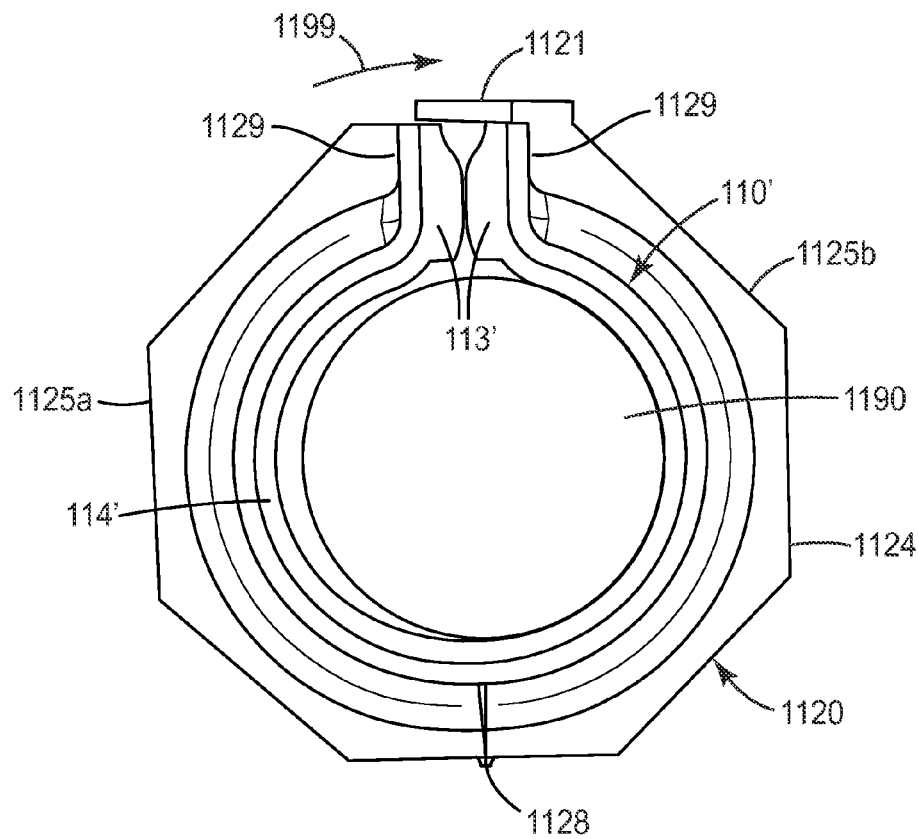
FIGS. 18A and 18B are two views showing the assembly of an exemplary enclosure using the sealing member of FIG. 17.
Figure 18B:
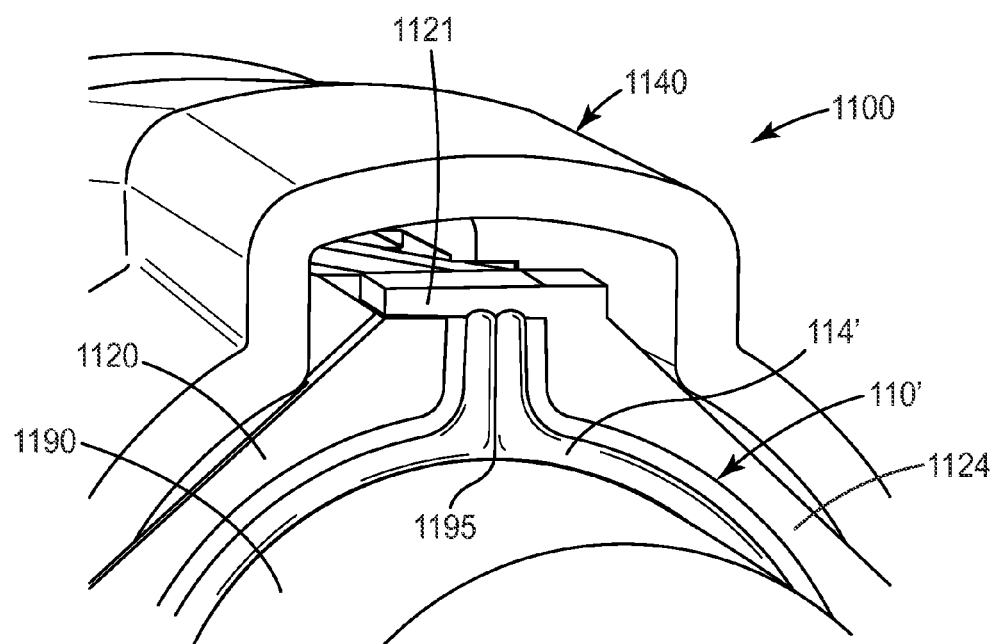

FIGS. 18A and 18B illustrate this enhanced containment. FIGS. 18A and 18B show the second end 1124 of inner shell 1120 during the assembly of an exemplary enclosure 1100. FIG. 18A shows the inner shell 1120 just prior to closure around cable connection 1190. The inner shell includes sealing member 110' attached to the flanges 1129 by a double sided tape or transfer adhesive (not shown). The gel nubs 113' on sealing member 110' are shown just as they contact one another. As the inner shell is closed around cable connection 1190 in a direction indicated by arrow 1199 by moving shell portion 1125a around living hinge 1128 relative to shell portion 1125b, the gel nubs are compressed to help fill the gaps and ensure a good seal at the triple point 1195 (FIG. 18B) between the enclosure and the cable connection.

FIG. 18B shows how the sealant material 114' seals around a cable connection. Shim 1121 prevents the sealant material from being squeezed out of the top of the seam between the shell portions 1125a, 1125b, instead diverting the extra gel provided by the gel nubs toward the cable connection to ensure the seal at the triple point 1195.

Figure 14:
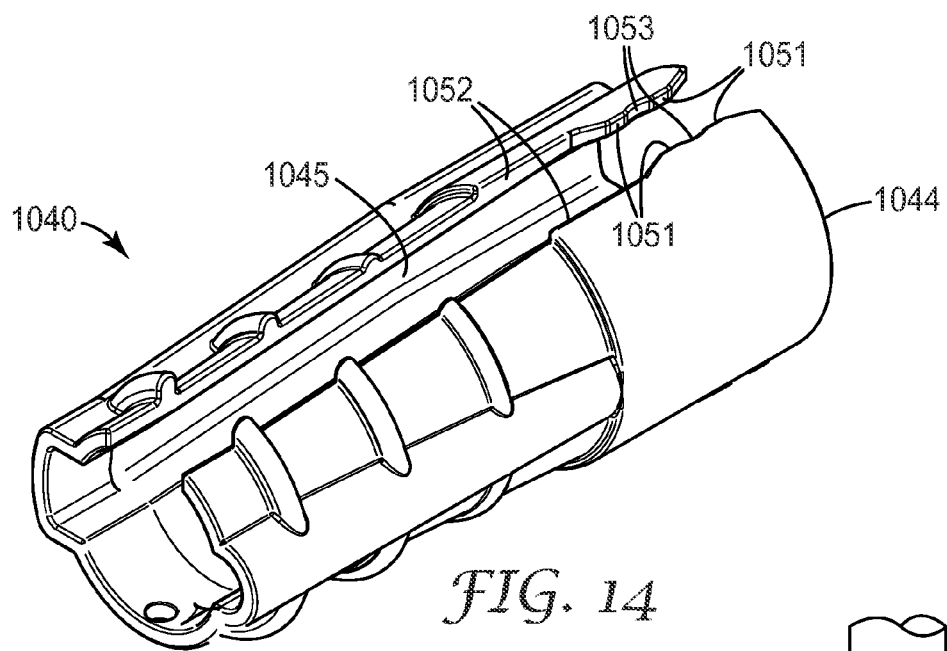
FIG. 14 is an isometric view of another exemplary outer shell according to an embodiment of the present invention.
Figure 15:
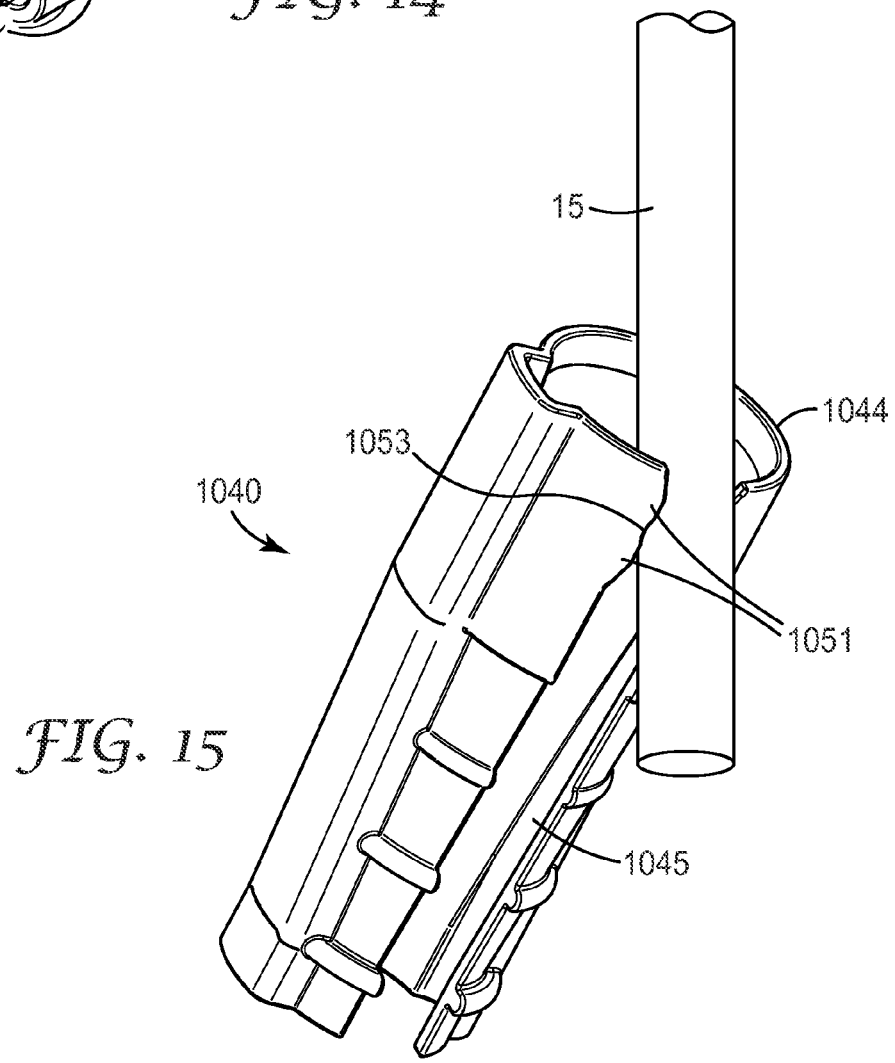
FIG. 15 is an isometric view showing the outer shell of FIG. 14 gripping a cable to prevent slippage during installation.

FIG. 14 is an isometric view of another exemplary outer shell 1040 that can be fitted over any of the previously described inner shells in accordance with the inventive enclosure described herein. Outer shell 1040 includes two pair of retention nubs 1051 located on the second end 1044 of longitudinal edges 1052 of opening 1045 and separated by indentions 1053. The retention nubs narrow the width of opening 1045 between the retention nubs and can prevent the outer shell from slipping off the cable once it has been inserted through the opening. During installation of the exemplary enclosure, outer shell 1040 can be inclined at an angle relative to cable 15 such that the cable engages first with the second end 1044 of the outer shell. When the cable slips past the first nub 1051 nearest the second end of the outer shell such that it resides between indentions 1053, the outer shell can be release and will be held on the cable as shown in FIG. 15. The combination of the two pairs of retention nubs and the indentations form a securing device to temporarily grip the cable in the indentions between the two pairs of retention nubs to prevent the outer shell from slipping down the cable while the inner shell is installed around the cable connection. Once the inner shell is in place over the cable connection the outer shell can be pushed toward the cable allowing the cable to completely pass through opening 1045 and be slid up and over the inner shell until the outer shell is secured in place.

Figure 9:
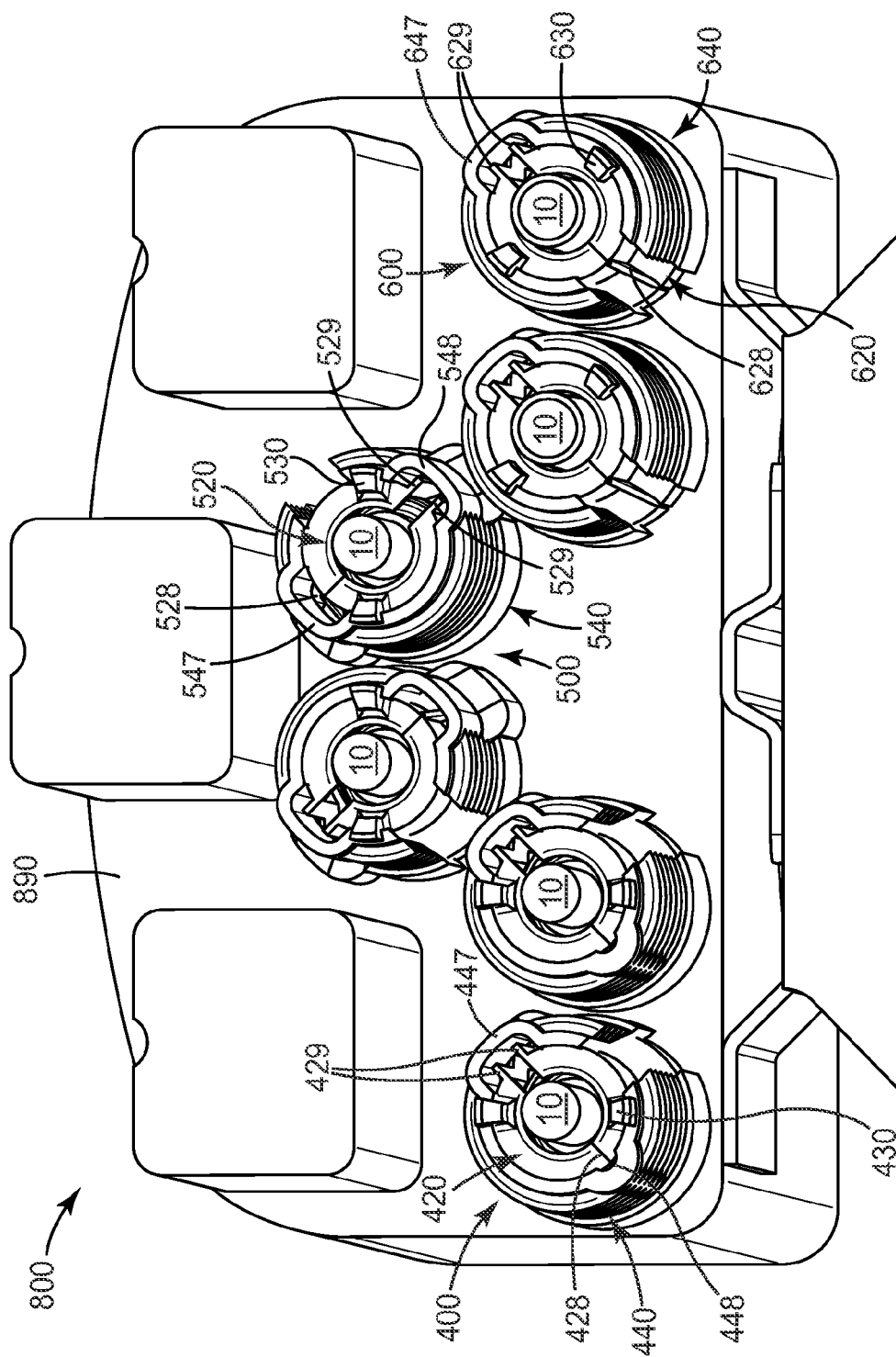
FIG. 9 is an isometric end view of an equipment housing with a plurality of cable connections that are protected by several additional embodiments of exemplary enclosures according to an embodiment of the present invention.

FIG. 9 shows an end view of an equipment housing 800 with a plurality of cable connections, which are represented by the ends of cables 10 shown in the figure, that extend through an end wall 890 of the equipment housing. The cables connections are protected by several additional embodiments of exemplary enclosures 400, 500, 600. The outer shells 440, 540, 640 of enclosures 400, 500, 600 can be locked in place over the inner shells 420, 520, 620 with a securing device, such as latch arms 430, 530, 630 provided as an integral part of the inner shells. Outer shells 440, 540, 640 have been designed to protect the hinge and/or the seam, such as seam 239 shown in FIG. 5B, that is formed between the second longitudinal edges or flanges of the inner shell when the inner shell is placed in a closed position. By adding tracks in the outer shells the seam and/or the hinge will be protected within the outer shell.

The inventive enclosures described herein can be used to protect closely packed cable connections. In an exemplary aspect, the inventive enclosures can be utilized to protect cable connections that have a 50 mm center to center spacing. In an alternative aspect, the inventive enclosures can be used to protect adjacent cable connections which are about 6 mm apart. In an alternative aspect, the exemplary enclosure can be used to protect a cable connection that is positioned within about 3 mm of a bulkhead, motor or other obstruction disposed on the outside of the equipment enclosure.

For example, the outer shell 440 of enclosure 400 has one large track 447 to accommodate the seam between the flanges 429 of inner shell 420 and a smaller track 448 to accommodate the living hinge 428 joining the shell portions of inner shell 420. Each track can extend the length of the outer shell and can be disposed at an angle of approximately +/−90° from the opening running the length of the shell. The inner shell can be inserted within the outer shell in the orientation shown in the figure.

To enhance the flexibility of the design, the outer shell 540 of enclosure 500 has two large tracks 547, 548 to accommodate the seam between the flanges 529 of inner shell 520 and the hinge 528 joining the shell portions of inner shell 520. Each track can extend the length of the outer shell and can be disposed at an angle of approximately +/−90° from the opening running the length of the shell. The larger track size can accommodate a larger hinge structure or allow the inner shell to be placed within the outer shell in one of two positions as shown in FIG. 9.

Also shown in FIG. 9 is the outer shell 640 of enclosure 600 that has one large track 647 to accommodate the seam between the flanges 629 of inner shell 620. The track can extend the length of the outer shell and can be disposed at an angle of approximately 180° from the opening running the length of the shell. The hinge 628 of the inner shell can be accommodated within the opening that runs the length of the outer shell 640.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An enclosure for protecting a cable connection, the enclosure comprising:
   a sheet sealing member coated with a gel sealant attached to an inner shell along two longitudinal edges of the inner shell such that the sheet sealing member is contained within the inner shell when the inner shell is secured around the cable connection and a rigid outer shell that longitudinally slides over and engages with the inner shell,
   wherein the outer shell imparts a radial compressive load to the inner shell to press the sealing member into contact with the cable connection to create an environmental seal, and wherein the inner shell has an external topography defining an inner shell profile and wherein the outer shell has an internal topography defining an outer shell profile wherein the outer shell profile is similar to the inner shell profile.

2. The enclosure of claim 1, wherein the inner shell has a tapered inner shell profile having a first diameter at a first end of the inner shell and a second larger diameter at the second end of the inner shell.

3. The enclosure of claim 1, wherein inner shell is composed of two shell portions.

4. The enclosure of claim 3, wherein the shell portions are connected by a hinge along one longitudinal edge of each shell portion.

5. The enclosure of claim 1, further comprising at least one latch arm to secure the outer shell in place over the inner shell.

6. The enclosure of claim 1, further comprising one or more strengthening ribs disposed on the exterior surface of the outer shell.

7. The enclosure of claim 1, wherein the sheet sealing member comprises the gel sealant material coated on one of an elastomeric sheet and a volume compliant sheet.

8. The enclosure of claim 7, wherein the gel sealant material comprises an oil swollen, cross-linked polymer network.

* * * * *

UNITED STATES PATENT AND TRADEMARK OFFICE
CERTIFICATE OF CORRECTION

PATENT NO. : 9,543,746 B2
APPLICATION NO. : 14/489637
DATED : January 10, 2017
INVENTOR(S) : William V. Dower Page 1 of 1

It is certified that error appears in the above-identified patent and that said Letters Patent is hereby corrected as shown below:

In the Specification

Column 8,
Line 23, delete "α-tochopherol" and insert in place thereof -- α-tocopherol --.
Line 24, delete "Sigma-Aldritch" and insert in place thereof -- Sigma-Aldrich --.
Line 55, delete "54055" and insert in place thereof -- S4055 --.
Line 65, delete "54055" and insert in place thereof -- S4055 --.

Column 9,
Line 2, delete "54077" and insert in place thereof -- S4077 --.
Line 5, delete "α-tochopherol" and insert in place thereof -- α-tocopherol --.
Line 7, delete "α-tochopherol" and insert in place thereof -- α-tocopherol --.

Column 10,
Line 49, delete "Hallalova" and insert in place thereof -- Hattalova --.
Lines 50-51, delete "LyondellBasel" and insert in place thereof -- LyondellBasell --.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*